US009699310B2

(12) United States Patent
Merjanian et al.

(10) Patent No.: US 9,699,310 B2
(45) Date of Patent: Jul. 4, 2017

(54) COMMUNITY SAFETY, SECURITY, AND HEALTH COMMUNICATION AND NOTIFICATION SYSTEM

(71) Applicant: Titan Health & Security Technologies, Inc., Newport Beach, CA (US)

(72) Inventors: Vic Merjanian, Newport Beach, CA (US); Paul Samra, Newport Beach, CA (US)

(73) Assignee: Titan Health & Security Technologies, Inc., Newport Beach, CA (US)

(*) Notice: Subject to any disclaimer, the term of this patent is extended or adjusted under 35 U.S.C. 154(b) by 0 days.

(21) Appl. No.: 14/789,876

(22) Filed: Jul. 1, 2015

(65) Prior Publication Data
US 2016/0006870 A1    Jan. 7, 2016

Related U.S. Application Data

(60) Provisional application No. 62/020,273, filed on Jul. 2, 2014, provisional application No. 62/092,711, filed on Dec. 16, 2014.

(51) Int. Cl.
*H04M 1/00* (2006.01)
*H04M 3/51* (2006.01)
*H04W 4/02* (2009.01)
*H04W 4/22* (2009.01)

(52) U.S. Cl.
CPC .......... *H04M 3/5116* (2013.01); *H04W 4/02* (2013.01); *H04W 4/22* (2013.01)

(58) Field of Classification Search
USPC ........................................ 379/37–52; 340/352
See application file for complete search history.

(56) References Cited

U.S. PATENT DOCUMENTS

| 8,736,443 | B1  | 5/2014 | Miasnik et al. |
| 8,812,607 | B2 †| 8/2014 | Daly |
| 9,147,339 | B1  | 9/2015 | Miasnik et al. |
| 2005/0085257 | A1* | 4/2005 | Laird ................. A61B 5/04 455/550.1 |

(Continued)

FOREIGN PATENT DOCUMENTS

WO    WO 2014182638    *    5/2014    ............ H04M 11/00

*Primary Examiner* — Maria El-Zoobi
(74) *Attorney, Agent, or Firm* — Sheppard, Mullin, Richter & Hampton LLP

(57) ABSTRACT

A community safety system, comprising a notification management entity comprising one or more servers, the notification management entity is communicatively coupled to a one or more user devices and one or more administrator devices; a plurality of registered users, wherein each registered user of the plurality of registered users is associated with a user category of a set of user categories; the notification management entity maintaining a list of the plurality of registered users and each registered user's associated user category; and a community safety system application operating on each of the one or more user devices and the one or more administrator devices; wherein at least one of the one or more administrator devices is associated with a police department.

25 Claims, 20 Drawing Sheets

(56) References Cited

U.S. PATENT DOCUMENTS

| | | | | |
|---|---|---|---|---|
| 2006/0109113 A1* | 5/2006 | Reyes | ............... | G08B 7/06 340/541 |
| 2009/0231122 A1* | 9/2009 | Yeung | ............ | G08B 13/19652 340/524 |
| 2014/0136607 A1* | 5/2014 | Ou | ................ | H04L 67/18 709/203 |

\* cited by examiner
† cited by third party

1300

COMMUNITY SAFETY, SECURITY, AND HEALTH COMMUNICATION AND NOTIFICATION SYSTEM

CROSS-REFERENCE TO RELATED APPLICATIONS

This application claims the benefit of U.S. Provisional Application No. 62/020,273 filed Jul. 2, 2014, and U.S. Provisional Application No. 62/092,711 filed Dec. 16, 2014, and which are hereby incorporated herein by reference in their entirety.

TECHNICAL FIELD

The disclosed technology relates generally to community notification systems, and more particularly, some embodiments relate to police integrated community communication and notification systems providing enhanced two-way interaction between users, administrators, and/or other categories of registered users, faster response, decentralized notification capabilities, and direct police-community interaction.

DESCRIPTION OF THE RELATED ART

When emergencies arise on campuses, such as schools and hospitals, providing information to the community is important in limiting the scope of the emergency. Some current solutions provide text-based notification systems that send a text or SMS broadcast message to all registered users at the same time, informing those registered users of a developing situation and providing relevant information to the user. Such systems essentially rely solely on the cellular network, meaning that the registered user must have a cell phone or other mobile device that is connected over the cellular network. Most of these systems are strictly one-way, meaning that a broadcast message may be sent to registered users, but registered users cannot contact the administrator regarding a developing emergency. Even in systems employing two-way communication systems, the method of communicating an emergency to system administrators requires the use of dedicated devices, such as disparately placed call boxes, or the information is provided only to a single, central entity (e.g., a single phone number or email address).

When an emergency does arise, another important feature in addressing the emergency is to maintain control over the campus itself. In some situations, a campus may go into a "lockdown" mode, whereby heightened security measures are implemented such as requiring everybody to stay inside a particular room and not permitting anyone to enter the property. Generally, initiating such a procedure requires accessing a lockdown system via a central terminal, typically located in a main office or area. For example, in the school environment, the central terminal is generally located at the front office of the school. In some circumstances, however, the main area with the central terminal may be compromised, making it difficult or impossible to initiate the lockdown. In such situations, the community at large may remain ignorant of a potentially dangerous situation, potentially enhancing the dangerousness of the situation.

BRIEF SUMMARY OF EMBODIMENTS

According to an embodiment of the disclosed technology, a community safety system is provided, comprising a notification management entity comprising one or more servers, the notification management entity is communicatively coupled to a one or more user devices and one or more administrator devices. A plurality of registered users, wherein each registered user of the plurality of registered users is associated with a user category of a set of user categories. The notification management entity maintains a list of the plurality of registered users and each registered user's associated user category. Registered users interact with the notification management entity via a community safety system application operating on each of the one or more user devices and the one or more administrator devices, wherein at least one of the one or more administrator devices is associated with a police department.

According to an embodiment of the disclosed technology, a method of providing two-way communication in an emergency communication system is presented, comprising a central management entity receiving an alert notification from a first registered user via an application operating on a user device, tagging the received alert notification with information identifying the first registered user, the central management entity broadcasting the tagged alert notification to one or more registered users associated with an administrator user category, and opening a communication channel between the first registered user and the one or more registered users associated with an administrator user category.

According to an embodiment of the disclosed technology, a method of staggered police notification is provided. The method comprises receiving a first alert notification from a first registered user, receiving a second alert notification from a second registered user, determining the elapsed time between receipt of the first alert notification and receipt of the second alert notification, comparing the elapsed time with a threshold value, and if the elapsed time is less than the threshold value, a notification management entity of a notification system transmits a broadcast message to one or more police departments via a notification system application operating on a user device associated with the one or more police departments.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
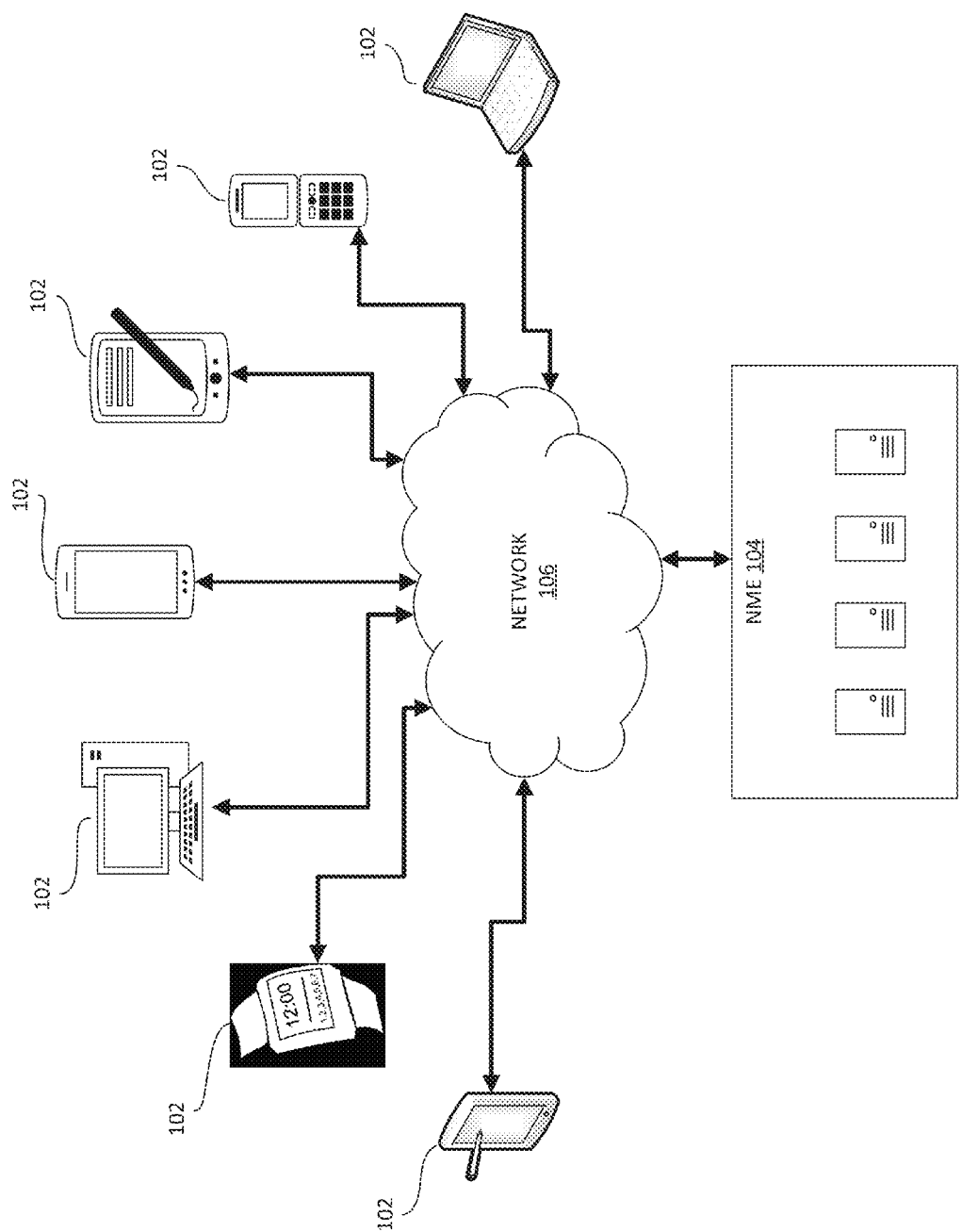
FIG. 1 is an example environment in which embodiments in accordance with the technology of the present disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The technology of the present disclosure addresses many of the drawbacks of current emergency systems for institutions, such as schools, hospitals, large venues, corporations, and other institutions. Embodiments of the technology disclosed herein provide a two-way communication system for initiating and broadcasting alerts of threats and emergencies developing that affect those associated with the institutions. Anyone associated with the system is capable of sending an alert notification to administrators (i.e., those responsible for ensuring the safety of all associated with the institution) of a threat or arising emergency, such as a shooter on the institution's campus, medical emergencies, or other emergency situations. Such alerts may be initiated by use of an application operating on any user device, such as a mobile phone, PDA, smartwatch, laptop, or other mobile device connected to a communication network, such as a cellular network, the Internet, or an intranet. This alleviates the drawbacks of standard call box technology, and ensures that the most temporally-relevant information is communicated to those in charge from the best source of valuable information—the individual at the scene as it is developing.

Further, embodiments of the technology disclosed herein provide a central management entity for managing communication between members of the institution. When an alert is initiated, the central management entity creates a dedicated communication channel between the individual who initiated the alert and one or more of the administrators responsible for protecting those associated with the institution. Individuals may provide additional details to the administrators in real-time directly from the scene, providing invaluable information for addressing and maintaining control of the situation.

The technology of the present disclosure further decentralizes the broadcast notification capability. Administrators are capable of generating broadcast notifications from anywhere via a user device. In some cases, broadcast notifications may be tailored for a specific category of registered users, and transmitted solely to that impacted user category. In this way, more tailored broadcast notifications are possible without the potential to bog down the communication network, alleviating the potential for notification delays due to network congestion. Such issues have arisen in current emergency communication systems, sometimes with notifications not reaching the intended recipients anywhere between two hours after being sent (such as the case with the Virginia Tech campus shooting) to even several days later.

A faster and more effective "lockdown" procedure may be achieved through implementation of embodiments of the present disclosure. A lockdown is a specialized broadcast message intended to notify all those of a serious situation occurring on campus. Generally, to initiate a lockdown procedure, most current systems require that an individual locate a hard wired telephone and enter a code, or trigger the lockdown via a device located in a central location, such as the main office of a school. However, if the emergency itself compromises the central location or renders an individual's ability to reach a telephone improbable, the lockdown is not triggered, meaning that others in the institution will remain ignorant to the dangerous situation. In live shooter drills conducted by police departments, one of the main drawbacks of current systems was the delay in triggering the lockdown procedure.

Embodiments of the technology disclosed herein addresses this drawback through a one-touch lockdown initiator that registered users may trigger via any user device. This enables individuals to trigger the lockdown without the need to go to a specific location and use a designated device, allowing the lockdown to be initiated from anywhere. This reduces the potential for the lockdown initiation process to be compromised.

Embodiments of the present disclosure further provide direct police-community interaction, unlike traditional emergency systems. Most current systems are self-contained, meaning that the police are not tied directly into the system. Instead, contact must be made with the police in addition to sending the notification out to members of the community or institution. Embodiments of the technology disclosed herein include a user category for the police, enabling valuable information regarding an emergency directly to the police, instead of needing to be relayed separately. Broadcast notifications may be sent to the police in addition to the rest of the community. Moreover, some embodiments include a special police notification capability. If the central management entity receives two alerts from different individuals within a certain amount of time of each other, the central management entity may send a specialized notification directly to the police indicating a potentially dangerous situation developing. Multiple threats may indicate one large emergency is developing that may require police intervention, or that there are multiple emergencies at one time that the administrators may not be capable of addressing simultaneously.

In addition, by including the police within the emergency communication system, the police are capable of directly interacting with members of the institution. Police may initiate alerts and generate broadcast messages via a user device in the same way as any other member of the institution. This incorporation of the police within the system helps build a greater relationship between the police and members of the institution, while allowing the police to directly communicate important information to individuals in an efficient and effective manner.

Unlike many current systems, the embodiments of the technology disclosed herein address many of the privacy concerns arising in the new digital age. In cases where members interact with the system via an application downloaded onto a user device, such as a mobile phone or tablet computer, the need to ensure privacy is important. This is especially true where embodiments are implemented at schools, where the privacy of the student is a major concern. Although the central management entity is capable of obtaining location data regarding each user, such location information—obtained via a GPS receiver or other location service of the user device—is not logged until the user attempts to initiate an alert. Even then, the central management entity does not track an individual's location once the initiated alert is ended. Moreover, the information is only obtained by the central management entity; no location data for a user is stored or obtained directly by an administrator or the police. To further increase privacy and security, no information regarding individuals are stored at the user device, only at the central management entity. In this way, information is made available only when it is necessary to address an ongoing emergency.

Before describing in detail the technology of the present disclosure, it may be helpful to describe an example environment in which embodiments of the technology may be implemented. FIG. 1 shows an example Community Safety System (CSS) 100 in which embodiments of the technology disclosed herein may be implemented. A plurality of user devices 102 are connected with a notification management entity (NME) 104 through a network 106. The type of communication network represented by network 106 may vary, depending on the communication protocol available to the user devices 102 at a given time. Some non-limiting examples of communication protocols over which the user devices 102 may connect to the network 106 include: cellular telecommunications protocols, such as GSM, UMTS, CDMA2000, LTE, or WiMAX; wired communication methods, such as cable, DSL, dial-up, or fiber-optic; or wireless communication methods, such as satellite communications, Wi-Fi, Bluetooth, or near-field communication (NFC). The user devices 102 may be able to utilize more than one type of communication protocol to connect with the network 106 in some embodiments.

User devices 102 may be any number of computing devices, having a memory and processor. Non-limiting examples of user devices 102 are: desktop computers; laptops; tablets; cell phones; smart phones; wearable technology, such as smart watches; PDAs; or other communication devices. An alert system application running on the user devices 102 provides a user interface that enables users to communicate with the NME 104 through the network 106. The alert system application may be an application downloaded to the user devices 102 and stored in memory. In some embodiments, the alert system application may be operating within another program running on a user device 102, such as a web browser.

The user devices 102 communicate with the NME 104 through the network 106. The NME 104 comprises one or more servers. In various embodiments, the NME 104 may be a data center where all the one or more servers are physically co-located. Other embodiments may have the one or more servers being located in different physical locations, with each of the servers being connected in a distributed computing network. In some embodiments, at least one of the one or more servers may be a virtual server. The NME 104 may comprise a cloud server. In various embodiments, the NME 104 may comprise a combination of these different server types.

Having thus described an example environment in which the disclosed technology can be implemented, various features and embodiments of the disclosed technology are now described in further detail. After reading the description herein, it will become apparent to one of ordinary skill in the art that the disclosed technology can be implemented in any of a number of different environments operating with any of a number of different user devices 102.

Figure 2:
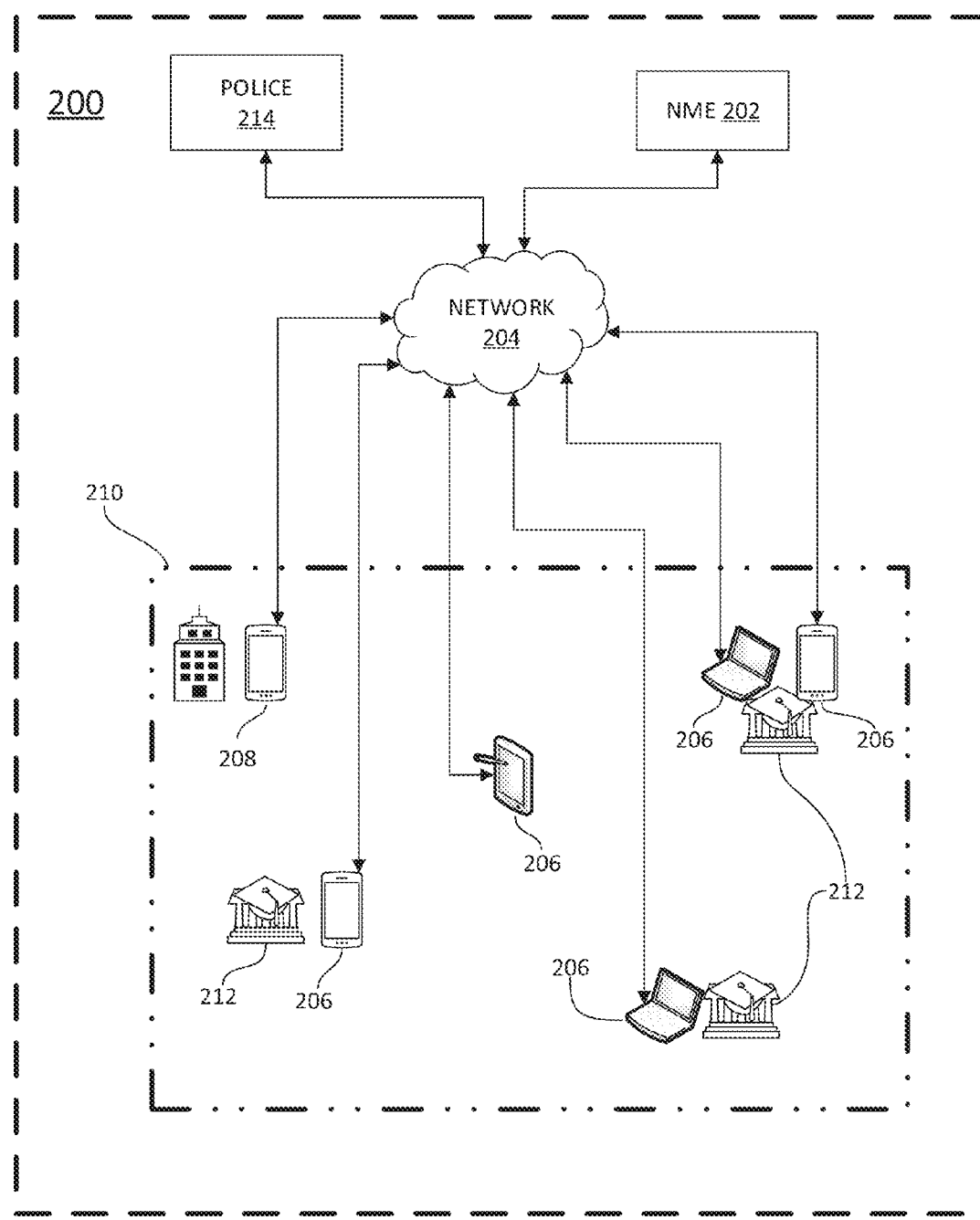
FIG. 2 is an example community safety system in accordance with embodiments of the technology of the present disclosure.

Embodiments of the technology disclosed herein provide an emergency notification system, the CSS, for use by communities and different entities, such as schools, hospitals, and malls. The CSS notifies communities members of ongoing emergencies and dangerous situations relevant to the community members. In addition, the CSS provides a secure, two-way communication system to enable community members to notify administrators and/or police of dangerous situations and emergencies occurring at the time. FIG. 2 illustrates an example implementation of the CSS 200 on a school campus in accordance with the technology disclosed herein. For ease of discussion, the various features of the CSS 200 will be described herein in reference to an example implementation on a school campus. The use of a school campus as the example environment in no way should be read to limit the application of the technology described herein to only that environment. After reading the description herein, it will become apparent to one of ordinary skill in the art that the disclosed technology can be implemented in any of a number of different communities, including hospitals, malls, airports, exhibition halls, and other large areas where many people may be present.

The CSS 200 includes an NME 202, a plurality of user devices 206, at least one administrator device 208, and a connection to the police 214. In various embodiments, the NME 202 may be similar to the NME 104 described with respect to FIG. 1. Each NME 202 services a particular security zone 210. The security zone 210 may be a single building 212 (i.e., a school building) or multiple buildings 212 comprising a campus. In various embodiments, the security zone 210 may encompass a continuous geographic area defining a campus, or it may encompass one or more geographically separate areas that together define a campus, such as satellite buildings located a few blocks away from a main campus. The security zone 210 may also encompass a buffer area around the campus. For example, the security zone 210 may encompass all the buildings 212 within the campus, as well as a buffer zone comprising all the surrounding area within 100 feet of the campus.

Each of the plurality of user devices 206 and the administrator device 208 can communicate with the NME 202 over a network 204. The network 204 may be similar to the network 106 described with respect to FIG. 1. The network 204 alerts to be sent to and from user devices 206 and at least one administrator device 208 from the NME 202.

Although identified as user devices 206 and administrator device 208, both categories of devices may be similar to the user devices 102 discussed above with respect to FIG. 1. For example, the administrator device 208 may also be one or more of: desktop computers; laptops; tablets; cell phones; smart phones; wearable technology, such as smart watches; PDAs; or other communication devices. The differentiation between user devices 206 and administrator devices 208 is related to the user category associated with the particular device at the time of operation, based on the method of registration with the NME 202. Registration shall be discussed in detail below.

The NME 202 is responsible for ensuring a secure and private connection between the user devices 206 and the at least one administrator device 208. As will be described in more detail below with respect to FIGS. 3-16, when the NME 202 receives an alert from one of the user devices 206, the NME 202 creates a secure communication channel between the user device 206 that sent the alert and at least one of the administrator devices 208 registered with the system. The secure communication channel provides two-way communication between the user who initiated the alert via the user device 206 and an administrator using the administrator device 208. In this way, the user may provide valuable additional information regarding the extent of the emergency. For example, if a medical emergency is occurring, the user can inform the administrator of the type of medical emergency is ongoing, such as an allergic reaction. With this additional information, the administrator using the administrator device 208 can identify the best course of action to address the situation.

In addition to creating secure communication channels, the NME 202 may also maintain a listing of all registered users on the CSS 200, and the user category to which they belong. For example, an CSS 200 implemented for a school environment may have the following types of user categories: students; teachers; and administrators. In other embodiments, greater or fewer categories may be included, depending on the granularity desired by the implementing institution. Each user category may have different capabilities. For example, a student may be able to initiate an alert and view broadcasted messages, while a teacher may be able to initiate an alert, view broadcasted messages, and initiate lockdown procedures via a lockdown button. In some embodiments, a "parents" user category may be included, which may be associated with a registered student to provide additional functionality to the student user. A more detailed discussion of the different capabilities available to each example user category will be discussed with respect to FIGS. 3-16.

The CSS 200 may include a connection to the police 214. The police 214 may interact with the CSS 200 in a variety of ways. In some embodiments, the police 214 may have a central terminal installed at one or more police departments within a certain distance of the security zone 210, such as, for example, a desktop computer. Police officers on duty and responsible for the area within which the security zone 210 is located may have administrator devices 208 in various embodiments that are connected to the NME 202 over the network 204.

By including the police within the CSS 200, greater community-police interaction is possible, thereby enabling the exchange of information between the two entities. In addition, by looping the police into the CSS 200, response time to emergencies may be reduced. In some embodiments, the CSS 200 may include a police notification trigger, which is a threshold related to the number of alerts received by the NME 202 within a given period that sends a special notification to the police 214 of one or more emergencies ongoing in the security zone 210.

For example, if the NME 202 receives two or more alerts within a five-minute period, the NME 202 immediately transmits the alert to the police 214. In this way, no one individual need contact the police such that, if the main office is compromised for some reason, the police will still be notified without requiring a person to physically pick up the phone and dial 911.

Figure 16:
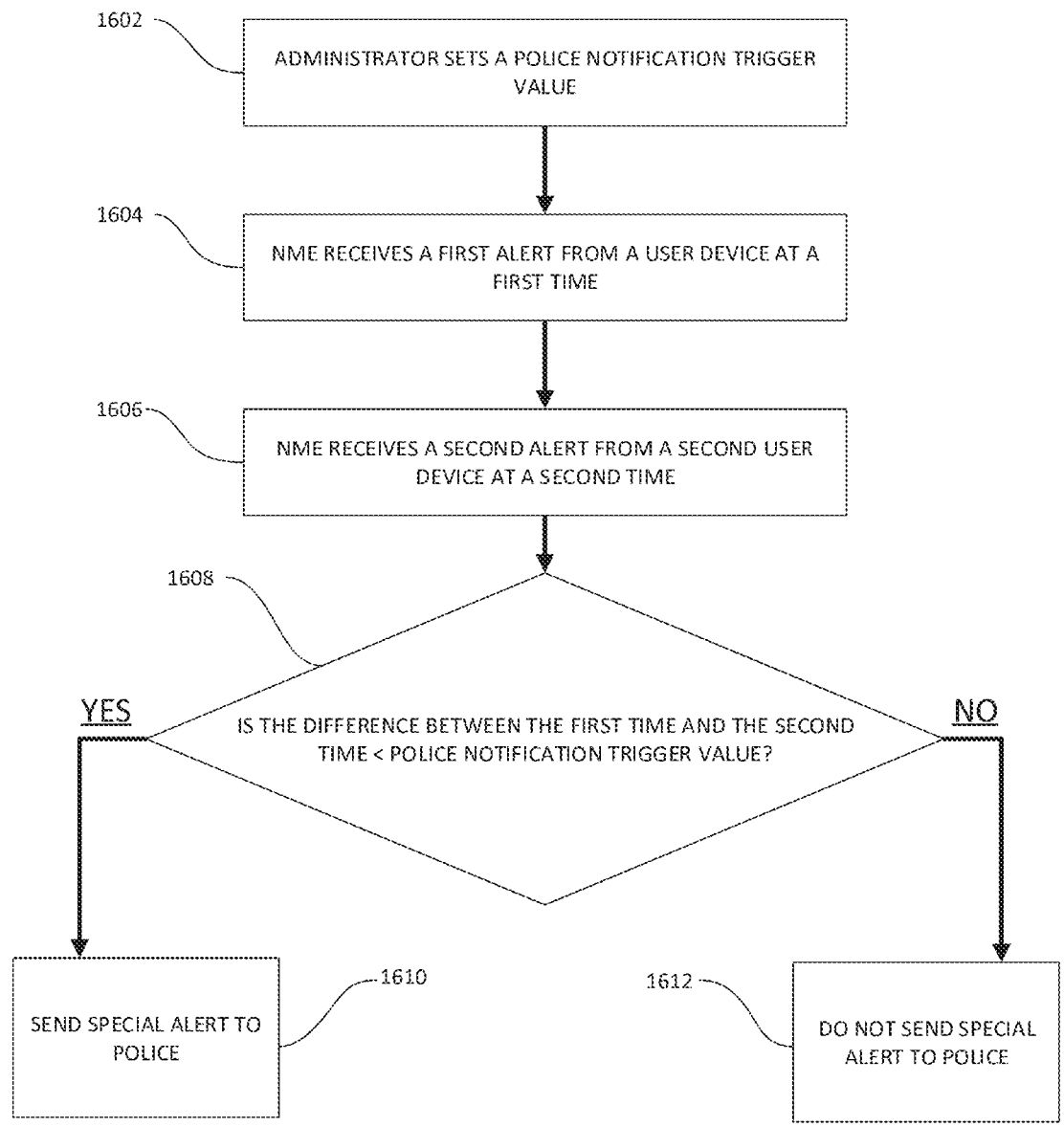
FIG. 16 is a flow diagram of an example threshold-based automatic police notification method in accordance with embodiments of the technology of the present disclosure.

FIG. 16 illustrates an example threshold-based automatic police notification method in accordance with embodiments of the technology of the present disclosure. Utilizing embodiments of the threshold-based automatic police notification method enable a NME 202 to alert police without the need for an administrator to initiate an alert be sent to the police 214. At 1602, an administrator sets a police notification trigger value. The police notification trigger value may be a set period between alert notifications received from multiple users in some embodiments, such that the NME 202 will send a broadcast notification to the police 214 if the time between two consecutive alert notifications received by the NME 202 from two registered users is less than the set period. In various embodiments, the police notification trigger value may be a set number of notifications received by the NME 202 during a set period, such that if the NME 202 receives four or more alert notifications within five minutes, the NME 202 immediately notifies the police 214. If the police notification trigger value is not exceeded in such embodiments prior to expiration of the period, the process starts over again.

At 1604, the NME 202 receives a first alert from a user device at a first time. The NME 202 records the time of the first alert. In some embodiments, the user device of 1604 may be an administrator device, i.e. a device utilized by a registered user associated with an administrator user category who is logged into a CSS application operating on the device. At 1606, the NME 202 receives a second alert from a second user device at a second time. Again, the NME 202 records the time of the second alert.

At 1608, the NME 202 identifies the period between the first time of the first alert and the second time of the second alert, and determines whether that period falls within the police notification trigger value set by the administrator at 1602. If YES, at 1610 the NME 202 transmits a special alert to the police 214. In some embodiments, the special alert may comprise a broadcast message to one or more administrator devices associated with the police 214 indicating that multiple events are developing on campus. The NME 202 may attach a detailed listing of the types of emergencies ongoing to the special alert in various embodiments, to provide the police 214 with additional relevant information.

If the period between the first time of the first alert and the second time of the second alert is greater than the police notification trigger value set by the administrator at 1602, the NME 202 does not take any action outside its normal operation, illustrated at 1612.

The users, administrators, and police may interact with the CSS 200 through a CSS application operating on the user devices 206 or administrator devices 208. The CSS application provides a user interface through which a user, administrator, or the police may send and receive alerts and communications through the NME 202 of the CSS 200. As discussed above, the CSS 200 may provide different user categories that may be associated with different registered users, providing different capabilities based on the associated user category.

Accordingly, each user is registered with the NME 202 prior to being included within the CSS 200. In some embodiments, the registration may be based on the particular user device 206 or administrator device 208 on which the CSS application is operating. Non-limiting examples of information indicative of the specific device that may be utilized for registration include: Internet protocol (IP) address of the device; media access control (MAC) address of the device; serial number of the device; and other unique identifiers associated with user devices 206 and administrator devices 208. In other embodiments, registration may be based on unique identifiers related to a particular user logged into the CSS application operating on a user device 206 or administrator device 208. Non-limiting examples of unique identifiers related to a particular user include: an email address; a username; or the last four digits of the user's social security number.

Privacy is a key concern in developing an emergency alert system similar to embodiments in accordance with the technology discussed herein. Although it is important to know who is generating alerts and their associated with an institution, it is important to make sure that not too much information is obtained that a person's privacy is thought to be violated. This is enhanced when dealing with minors, such as primary school-aged students. In some cases, the registration process may only require the user's first and last name, and an associated email address. In this way, the person is identified by their given name, and the email address may be used for verification purposes.

Through registration, the NME 202 is capable of monitoring what users are capable of generating alert notifications. In addition, registration enables the NME 202 to include identifying information of the user, such as the user's name, to curtail the possibility of false alert generation by anonymous users. In some embodiments, the NME 202 may require that an administrator or supervisor of the institution implementing the CSS 200 must verify any user attempting to register with the CSS 200 before the user is permitted to access the NME 202. The addition of users may need to be conducted by the implementing institution in some embodiments, instead of allowing individual users to attempt to register themselves. User information may be inherited from one or more databases or management information systems associated with an institution in various embodiments. For example, where the CSS 200 is implemented within a school environment, user information could be inherited from school or school district databases, such as a student information system managed by the school district. When the student graduates or leaves a particular school, the CSS 200 can update based on information from the student information system indicating that the student is no longer associated with that particular school or CSS 200, and may remove them from the system.

Although described with respect to a single institution, the CSS 200 may include multiple physical institutions, e.g., the CSS 200 covers an entire school district with multiple individual schools. In such embodiments, the CSS 200 may be managed by a school district. The NME 202 may be configured to dedicate one or more servers to each school, creating multiple sub-CSS domains within the CSS 200. The multiple sub-CSS domains may be serviced by all the servers of the NME 104 in some embodiments, and the NME 104 may be configured to provide additional processing power to a particular sub-CSS domain based on the bandwidth necessary at a particular time, i.e., if an emergency is ongoing and messages need be sent to a large number of registered users. In this way, the CSS 200 enables robust response and can ensure that messages are delivered in a timely fashion.

As discussed above, each user category is provided different capabilities within the CSS 200. In the present example implementation on a school campus, there are five different user categories: student; parent; teacher; administrator; and police. Although the present example has five categories, other example implementations may have greater or fewer user categories, depending on the different types of users that may be present in the security zone 210, or the number of differences in capabilities that the implementing institution wants to provide.

Each user, administrator, and police department/officer may interact with the CSS 200 through a CSS application operating on the user devices 206 or the administrator device 208. The capabilities available to each user are dependent on the user category associated with the user. When a registered user logs into the CSS application on a device, the NME 202 identifies the user category to which the logged-in user is associated and provides a user interface enabled with the capabilities available for that user category. FIGS. 3-16 are example user interfaces in accordance with the technology of the present disclosure. Example embodiments identifying different capabilities for the example user categories identified above will be described within reference to FIGS. 3-16.

Figure 3:
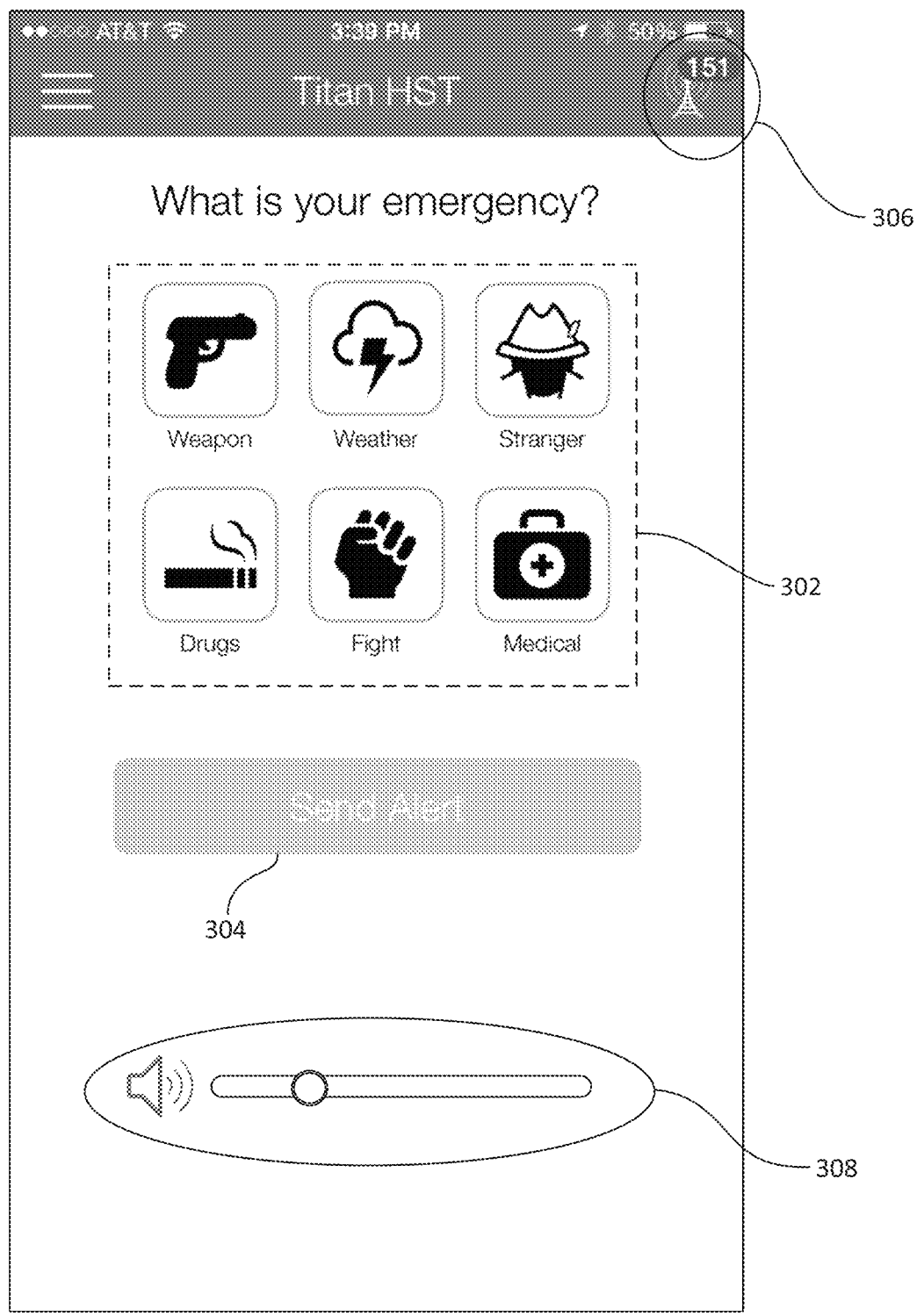
FIG. 3 is an example student interface of an example community safety system interface operating on a user device accordance with embodiments of the technology of the present disclosure, implemented in an example school environment.

FIG. 3 is an example student user interface 300 in accordance with various embodiments of the technology disclosed herein. In the example school campus implementation, the student user category is allowed to generate an alert and view broadcast messages. As illustrated in FIG. 3, the student user interface 300 includes an alert type area 302. A student may use the alert type area 302 to select a type of alert to generate. In various embodiments, the alert type area 302 may include a set of pre-defined alert types represented by selectable icons. In the illustrated student user interface 300, the alert type area 302 includes several pre-defined alert types: an alert for a weapon on campus; an alert for weather-related emergencies; an alert for an unknown or suspicious person being on or near campus; an alert for drug use or sales occurring on campus; an alert for a fight about to start or ongoing; and an alert for a medical emergency. Additional categories may be included in other embodiments, such as a type for maintenance-related emergencies (i.e., water pipe burst on campus). A user-definable type may be included in some embodiments to enable the student to provide their own defined type of emergency, in the event the emergency does not fall within the pre-defined types in the alert type area 302.

Once the student has selected the type of alert from the alert type area 302, the student can send the alert by clicking the "Send Alert" button 304. By hitting the "Send Alert" button 304, an alert notification is sent to the NME 202 illustrated in FIG. 2. In some embodiments, the alert may be sent after a certain amount of time passes after the student selects the alert type in the alert type area 302, without the need to hit a "Send Alert" button 304. In some situations, it may be better and safer to enable a one-touch alert, instead of requiring the student to hit the "Send Alert" button 304. Various embodiments may include a quick-alert shortcut, wherein the user may bypass the need to hit the "Send Alert" button 304. Where the CSS application is running on a device having a traditional input system (e.g., a mouse), the student may simply double-click the selectable icon within the alert type area 302, immediately sending the alert. Where the CSS application is running on a device having a touchscreen or other pressure sensitive input, the CSS application may immediately send the alert based on the pressure applied in selecting the selectable icon. Light pressure may select the selectable icon, but heavy pressure may select the type of alert and initiate the alert in one motion.

After receiving the alert from the student, the NME 202 identifies the registered individuals associated with the administrator user category, and sends the alert to one or more of those identified administrators. By alerting those associated with the administrator user category, those with the authority to initiate a lockdown procedure can determine whether such a procedure is necessary, based on the nature of the received alert. In some embodiments, the NME 202 may send the alert to all the administrators associated with the administrator user category. In various embodiments, the NME 202 may send the alert to a subset of those associated with the administrator user category.

Figure 4:
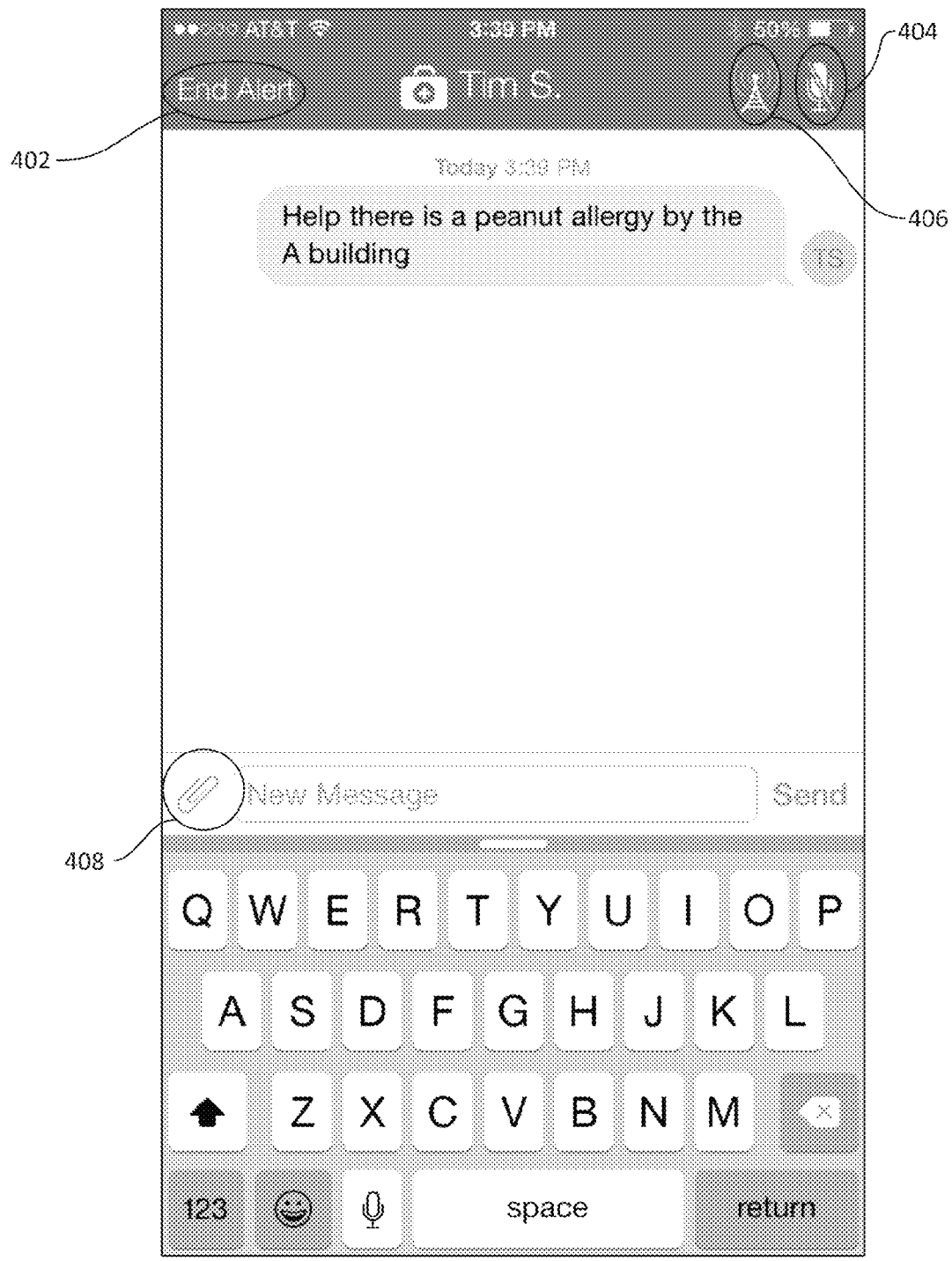
FIG. 4 is an example communication channel interface of an example community safety system application operating on a user device in accordance with embodiments of the technology of the present disclosure.

In addition to routing the alert to one or more of the registered administrators, the NME 202 also opens a dedicated communication channel between the student's user device 206 and one or more of the administrator's administrator devices 208. FIG. 4 illustrates an example communication channel interface 400 opened in the CSS application operating on the student's user device in accordance with embodiments of the technology of the present disclosure. By providing the communication channel, administrators are capable of obtaining additional information regarding the ongoing emergency from the student who initiated the alert. The NME 202 opens the communication channel interface 400 in the CSS application operating on the student user device 206 immediately after the student sends the alert in some embodiments. In other embodiments, the NME 202 may delay in opening the communication channel interface 400 on the student user device 206 until at least one of the administrator devices 208 acknowledges the alert and is ready to speak with the student. A similar communication channel interface 400 is also opened on at least one of the administrator devices 208 that acknowledge the alert. In some embodiments, more than one administrator device 208 may acknowledge the alert, and the NME 202 will open a similar communication channel interface 400 on each acknowledged administrator device 208. In such embodiments, a group communication is established between the student user device 206 and each acknowledging administrator device 208, allowing all participants to see the ongoing communication.

The ability for two-way communication between the student who initiated the alert and the one or more administrators enabled by the communication channel interface 400 opened by the NME 202 improves the traditional one-way, text-based notification systems currently employed on institutional campuses. Allowing students to initiate alerts via a user device 206 from anywhere on campus reduces the time necessary to provide valuable information to administrators or the authorities, alleviating the issues related to stationary call boxes. Further, information may be gathered in real-time, removing the delay between the identification of an emergency and administrators and authorities arriving at the scene.

In some embodiments, students and administrators may transmit more than just text-based messages to each other, further improving upon the current systems. As illustrated in FIG. 4, the communication channel interface 400 may include the ability to send voice recordings by toggling a microphone button 404. When engaged, the microphone button 404 activates the microphone of the user device 206 to enable the student to record a message to send to the one or more administrator devices 208. In some embodiments, the microphone button 404 may open an audio stream through the NME 202 in the event that the student is unable to type a text-based message or wants to allow the administrators to listen to everything that is ongoing.

Students may also attach files to send to the one or more administrator devices through the communication channel interface 400 by selecting an attachment button 408. The files attached by the student may be files stored in the memory of the user device 206 in some embodiments. The files may include documents, photos, video, or other data item that the student wants to send to the administrator devices. In some embodiments, students may also be able to send stored video clips or streaming video through the communication channel interface 400 to the administrator devices 208.

Although described in relation to the capabilities of the student within the communication channel interface 400, each administrator may be able to send text, audio, video, or other types of data to the student via the similar communication channel interface operating on the administrator devices 208.

In various embodiments, once the student has initiated an alert through the student user interface 300 of FIG. 3, the student may only communicate with administrators until the alert is ended. The communication channel interface 400 of FIG. 4 may include an "End Alert" button 402 in some embodiments, which a student may use to end an alert that that student initiated through an CSS application operating on the student's user device 206. Students may only end alerts that the particular student initiated; those associated with the student user category do not have the capability to end alerts initiated by another person.

Referring back to FIG. 3, the example student user interface 300 may further include an audible alert trigger 308 in various embodiments. Some emergency situations may require an audible and visible alert at the scene. For example, if a student is being stalked or followed by a stranger, or is being assaulted, alerting those within the vicinity as to the emergency may help cease or prevent further harm. In various embodiments, a student may trigger an audible alarm by sliding the audible alert trigger 308. Where the student's user device includes a touch screen, the student may trigger the audible alarm by swiping the audible alert trigger 308 to one side. The direction of the swipe may be configured based on the dominant hand of the student: in some embodiments, the swipe may be to the left, in other embodiments, the swipe may be to the right. In some embodiments, the student may be able to swipe in the left or right direction. When used, the audible alert trigger 308 of the CSS application may initiate a loud alarm sound utilizing speaker included within the user device, alerting those nearby of an emergency and potentially scaring off the suspicious character or attacker. In various embodiments, the audible alert trigger 308 may also trigger a visible indicator, such as flashing a light included within the user device.

To ensure that students do not accidently initiate the audible alert trigger 308, the CSS application may identify whether a swipe was intended or not in various embodiments. The CSS application may only initiate the audible alert if the student swipes the audible alert trigger fully across the screen, indicating that the student truly intended to initiate the alert. If the student does not fully swipe across the screen, the audible alert trigger 308 may return to its original position and the CSS application would not initiate the audible alert.

Both the example student user interface 300 and the communication channel interface 400 allow a student to view broadcast notifications by clicking on a broadcast message button 306, 406. Broadcast messages are notifications broadcast by one or more administrators to all registered users of the CSS 200 of FIG. 2, providing information regarding emergencies occurring within the security zone 210. In this way, the broadcast messages keep everyone informed of ongoing situations, and can be used to provide relevant information, such as locations of protection, safe exits, and to warn those not within the security zone 210 to stay away until the emergency is resolved. The broadcast message button 306, 406 may be represented by an icon, like the radio tower icon in the illustrated examples of FIGS. 3 and 4. In other embodiments, the broadcast message button 306, 406 may be a text button, similar to the illustrated example "End Alert" button 402.

Figure 5:
FIG. 5 is an example broadcast message interface of an example community safety system application operating on a user device in accordance with embodiments of the technology of the present disclosure.

An example broadcast message interface 500 in accordance with the technology disclosed herein is illustrated in FIG. 5. As illustrated, the broadcast message interface 500 includes a listing of the broadcast messages sent by administrators and/or the police to all registered users of the CSS 200 of FIG. 2. An example broadcast message 502 shows a broadcast message related to an initiated lockdown procedure. Another example broadcast message 504 shows a broadcast message containing evacuation or relocation information related to an emergency occurring at Demo High School. The broadcast message interface 500 may store a listing of all the broadcast messages sent by administrators and/or police to the registered users of the CSS 200 in some embodiments. In other embodiments, the broadcast message interface 500 may list only the last x number of broadcast messages, such as the last 10, 20, or 35 broadcast messages. Each broadcast message shown in the broadcast message interface 500 may have an expiration value in various embodiments, wherein the broadcast message is no longer shown in the broadcast message interface 500 after a certain amount of time. The broadcast message notifications visible in the broadcast message interface 500 may be stored locally on a user device or an administrator device, or the notifications may be stored at the NME and pushed or pulled to the user device or administrator device when the broadcast message button 306, 406 is activated.

Figure 19C:
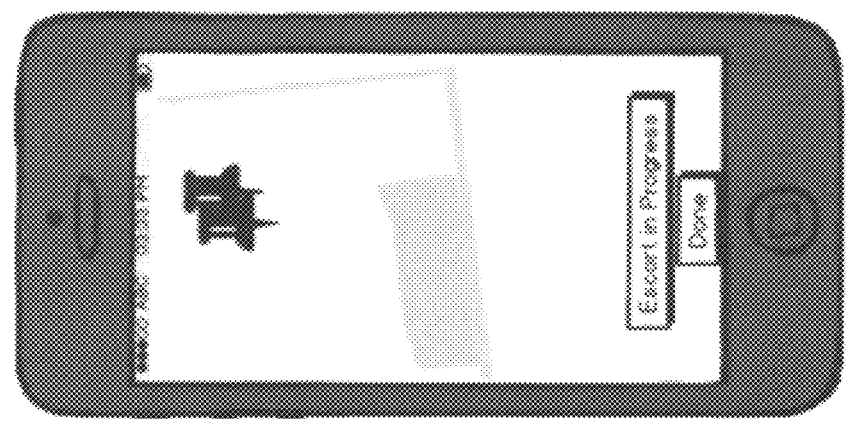
FIGS. 19A, 19B, and 19C illustrate an example escort request interface in accordance with embodiments of the technology of the present disclosure.
Figure 19B:
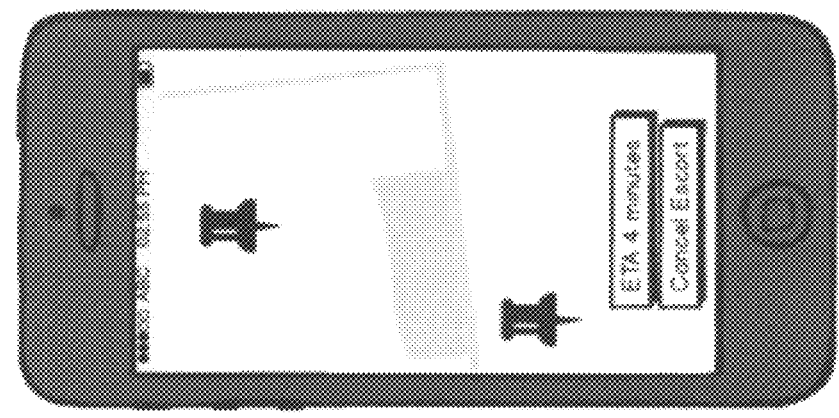
Figure 19A:
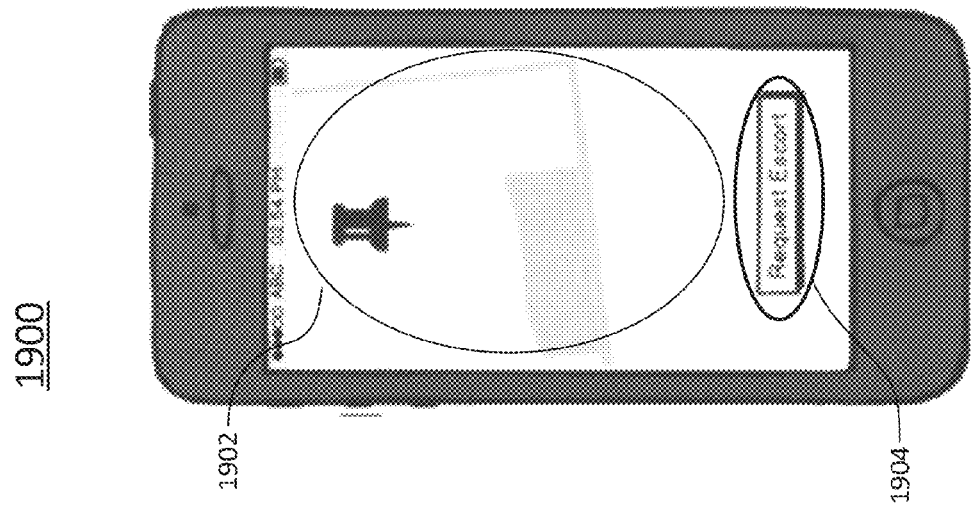

In some embodiments, the CSS 200 may further enable students to request escorts in the event the student does not feel safe traveling alone or needs assistance for some reason. FIGS. 19A, 19B, and 19C illustrates an example escort request interface 1900 in accordance with embodiments of the technology of the present disclosure. A student may enter the escort request interface 1900 by selecting an escort request button in an options menu of the example student user interface 300 of FIG. 300. In some embodiments, the options menu may be a drop down menu available on the student user interface 300 or it may be accessible by clicking or swiping to the side of the student used interface 300.

As shown in FIG. 19A, the escort request interface 1900 may include a map marker area 1902. The student may use the map marker area 1902 to indicate where on the map a student. In some embodiments, the CSS 200 may obtain location data from the user device and use the location information in identifying where the student is on the map in the map marker area 1902. The student may, in some embodiments, move the marker identifying where the student is to another location, if the student wants to meet the requested escort at another location. In some embodiments, the student may also enter a destination address.

After the student has identified where the student is located or wants to be picked up, the student may request an escort by selecting the "Request Escort" button 1904. In some embodiments, the request may be sent automatically once the student presses the "Request Escort" button 1904. In other embodiments, a confirmation screen may be displayed by the CSS application to ensure that the student wants to request the escort. In such embodiments, where the CSS application is running on a device having a traditional input system (e.g., a mouse), the student may simply double-click the "Request Escort" button 1904, immediately sending the request. Where the CSS application is running on a device having a touchscreen or other pressure sensitive input, the CSS application may immediately send the request based on the pressure applied in selecting the "Request Escort" button 1904. Light pressure may register as a normal press of the "Request Escort" button 1904, but heavy pressure may bypass any delay or confirmation screen and immediately send the request.

Once the request has been sent and accepted, the escort request interface 1900 may indicate to the student that the request has been accepted and provide an estimated time of arrival for the escort. FIG. 19B illustrates an example escort request interface 1900 for such an embodiment. In some embodiments, the escort request interface 1900 may include additional information. Some non-limiting examples of additional information that may be provided to the student via the escort user interface 1900 of FIG. 19B include: the name of the escort; a picture of the escort to enable the student to identify the escort; the phone number of the escort; or estimated routes that may be taken once the escort arrives to reach the intended destination, if the student is able to enter a destination address. As the escort moves closer to the student, the escort request interface 1900 of FIG. 19B may display to the student the actual location of the escort.

FIG. 19C illustrates an example escort request interface 1900 once the escort has begun in accordance with embodiments of the technology disclosed herein. As shown in FIG. 19C, the escort request interface 1900 indicates that the escort is in progress. In some embodiments, the CSS 200 may be capable of determining that the escort has begun based on the relative locations of the student and the escort, as identified based on location information obtained from each respective user device. Various embodiments may require that the escort indicate that the escort has begun using a CSS application running on the escort's user device.

Although described with respect to a registered user associated with a student user category, some embodiments may enable any registered user to request an escort. For example, in some embodiments a registered user associated with a teacher user category may need an escort to help assist in moving from one place to another.

Figure 6:
FIG. 6 is an example teacher interface of an example community safety system interface operating on a user device accordance with embodiments of the technology of the present disclosure, implemented in an example school environment.

FIG. 6 illustrates an example teacher user interface 600 where the user is associated with the teacher user category in accordance with embodiments of the technology of the present disclosure. In the illustrated embodiment, the teacher user interface 600 is similar to the example student user interface 300 of FIG. 3. In various embodiments, the teacher user category has the same capabilities to create an alert (602, 604), communicate with administrator devices 208 (i.e., a similar communication channel interface 400 as illustrated in FIG. 4), and view broadcast messages (i.e., broadcast message button 606). These functions of the teacher user interface 600 function in a similar way as those described above with regards to FIGS. 3 and 4. Although not shown in FIG. 400, the example teacher user interface 600 may include an audible alert trigger similar to the audible alert trigger 308 illustrated in FIG. 3.

As discussed above, a key to resolving emergencies is the ability to control the campus, which is usually achieved by initiating a "lockdown" of the campus. In various embodiments, a lockdown includes sending a broadcast message to all registered users and administrators indicating that the school is on lockdown. Many active shooter drills, performed by police departments to check the lockdown procedures of schools, have identified, however, that lockdown procedures were too slow. This means that it took too long for the lockdown to be initiated, enabling the live shooter to injury and/or kill one or more persons on campus. One of the reasons for the slowness of the lockdown procedure was that a lockdown generally needed to be initiated from the front office. If an emergency compromised the front office, a lockdown procedure may never actually be initiated.

Figure 7:
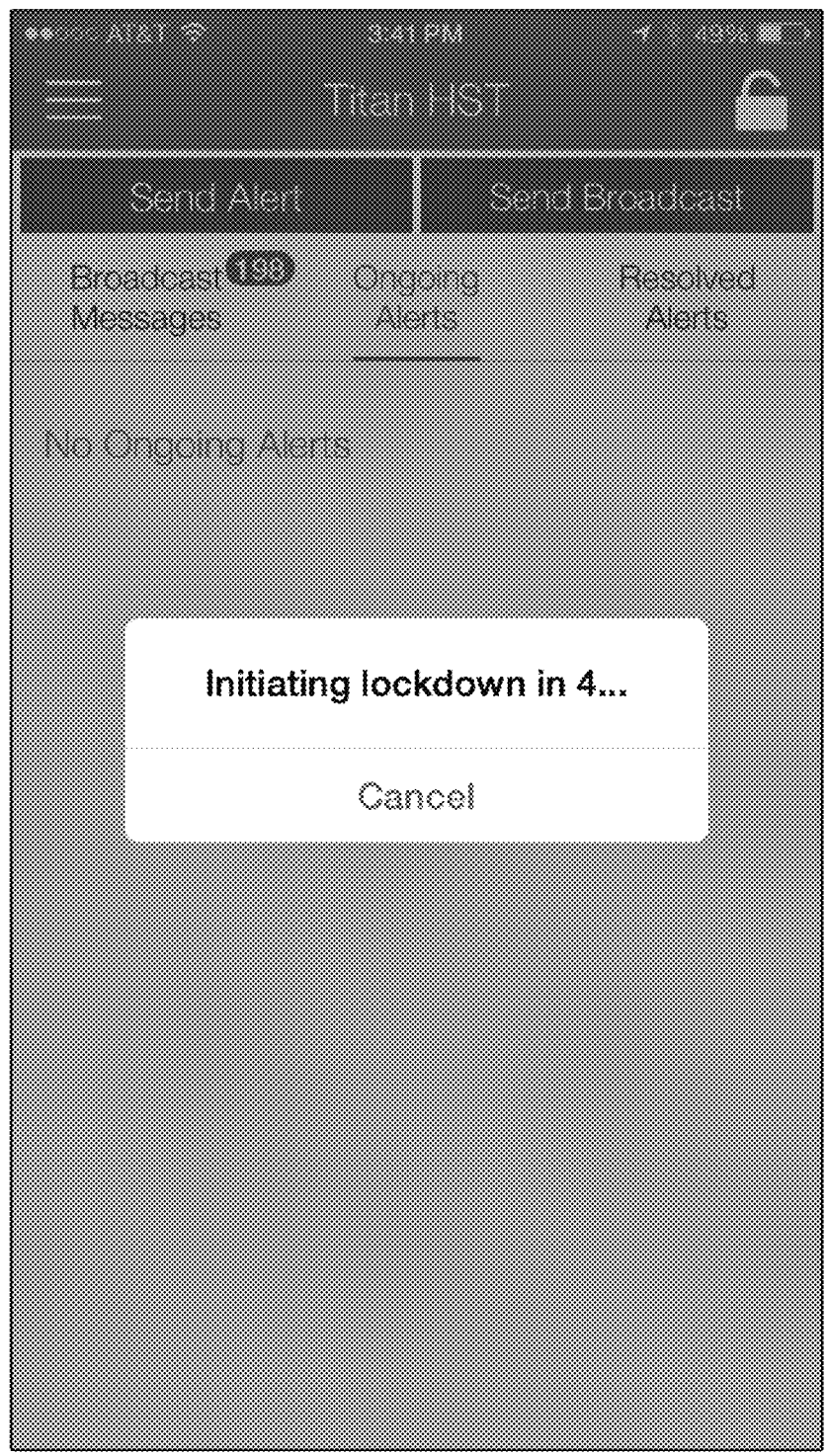
FIG. 7 is an example lockdown initiation interface of an example community safety system application operating on a user device in accordance with embodiments of the technology of the present disclosure.

To address these issues related to initiation of a lockdown, embodiments of the CSS 200 in accordance with the present disclosure provides a one-touch lockdown capability. Because teachers themselves may be the closest school officials/employees with sufficient information to determine whether the situation calls for a lockdown to be initiated, some embodiments of the teacher user interface 600 includes a lockdown initiator 608. If necessary, a teacher may use his or her user device 206 to initiate a download by pressing the lockdown initiated 608. In some embodiments, the lockdown procedure may begin immediately after the teacher presses the lockdown initiator 608. To provide for potential unintended initiations, a timed delay may begin once the lockdown initiator 608 is pressed, providing a period during which the lockdown may be cancelled, in some embodiments. In such embodiments, the CSS application may enable immediate initiation of a lockdown in similar fashion as the immediate alert generation described above with respect to FIG. 3 and the double-click/heavy pressure functionality. For example, a double-click on the lockdown initiator 608, or heavy pressure on the lockdown initiator 608, may result in an immediate initiation of the lockdown procedure, bypassing any delay. An example lockdown initiation interface 700 in accordance with the present disclosure is illustrated in FIG. 7.

Figure 20B:
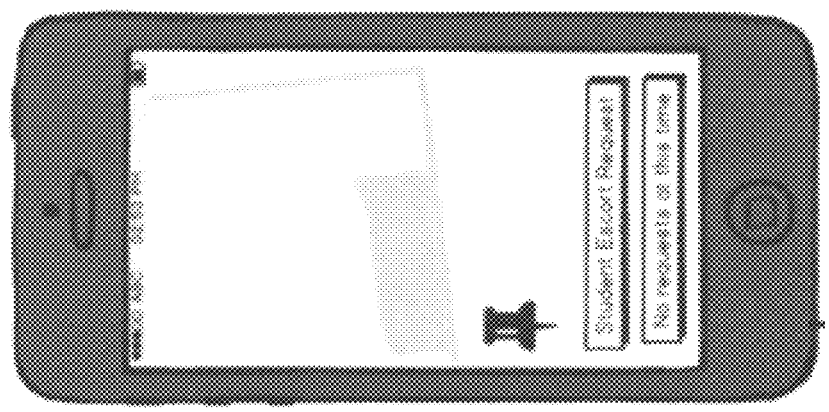
FIGS. 20A and 20B illustrate an example escort user interface in accordance with embodiments of the technology of the present disclosure.
Figure 20A:
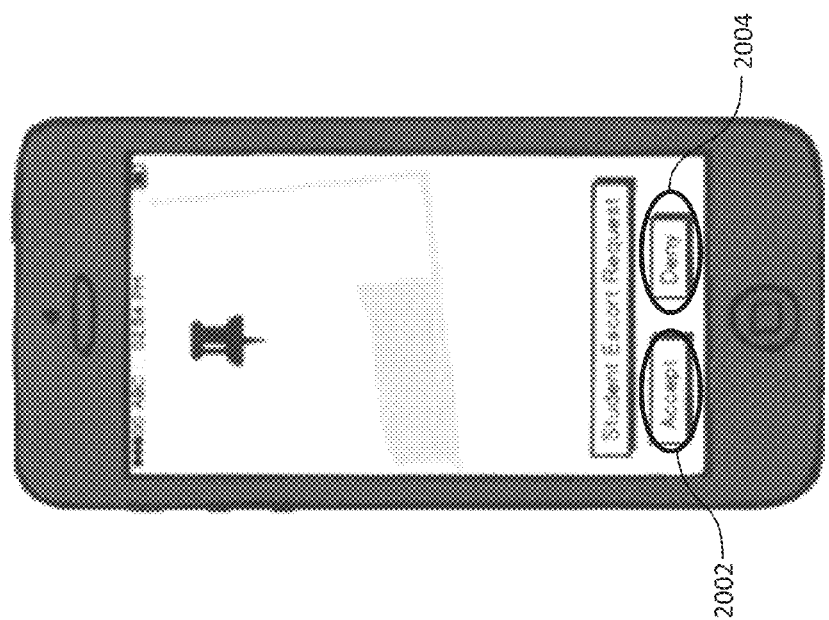

A teacher user category may also be capable of serving as an escort, as described above with respect to FIGS. 19A, 19B, and 19C. Escorts could also be registered users associated with other categories, such as administrators, supervisors, police, or even other students. When acting as an escort, a registered user may accept a request for an escort and assist another registered user. FIGS. 20A and 20B illustrate an example escort user interface 2000 in accordance with embodiments of the present disclosure. As illustrated in FIG. 20A, the escort user interface 2000 may display to the registered user acting as the escort information indicating that a student or other registered user as requested an escort. The escort user interface 2000 may also display additional information, such as but not limited to the name of the requester, phone number of the requester, a photo of the requester, the intended destination, or other information relevant to deciding whether to assist with the escort.

The registered user acting as the escort may press an "Accept" button 2002 to indicate that he or she is willing to assist in escorting the requester. In some embodiments, pressing the "Accept" button 2002 may result in the escort user interface 20A changing to indicate that the request has been accepted and the time until arrival. In some embodiments, this escort user interface 2000 may be similar to the escort request interface 1900 described above with respect to FIG. 19B. Various embodiments may include a button to open a communication channel with the requester, similar to the communication channel described above with respect to FIG. 4.

If the registered user acting as the escort does not want to accept the request for some reason, the user could press the "Deny" button 2004. By pressing the "Deny" button 2004, the escort user interface 1900 may change and look like the escort user interface 1900 illustrated in FIG. 20B. The request that was denied may be removed from the escort user interface 2000 of FIG. 20B. Where there are no more currently pending escort requests, the escort user interface 2000 of FIG. 20B may indicate that there are no additional requests.

Figure 8:
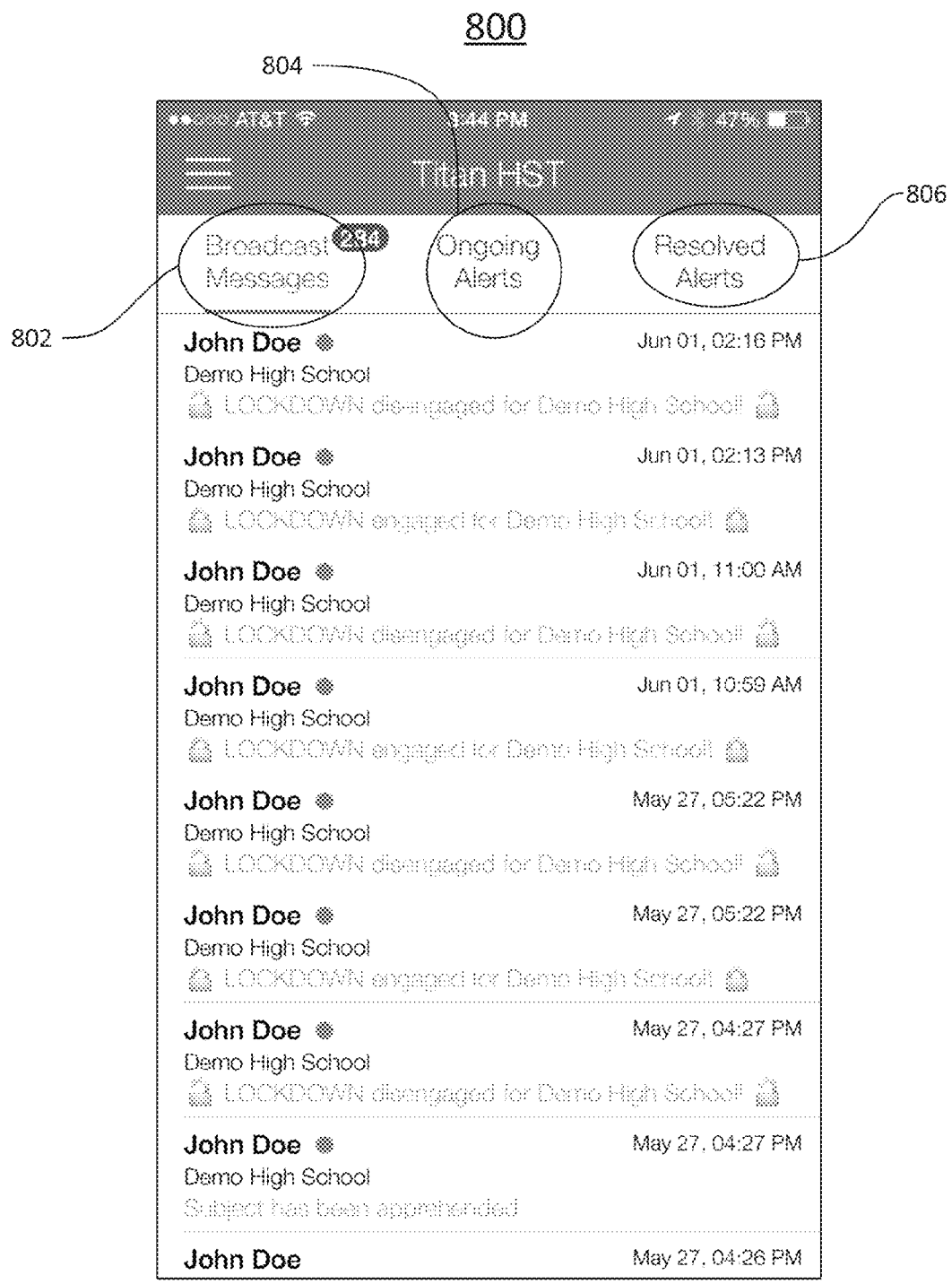
FIG. 8 is an example parent interface of an example community safety system interface operating on a user device accordance with embodiments of the technology of the present disclosure, implemented in an example school environment.

In some embodiments in accordance with the technology of the present disclosure, the CSS may include a user category for individuals who, all though not directly associated with an institution, may still have an interest in emergencies that may arise. In the example school implementation, such a user category may consist of parents or legal guardians of students attending the school. FIG. 8 is an example parent user interface 800 in accordance with the technology of the present disclosure. As illustrated, the capabilities of the parent user category is more limited than the student or teacher user category discussed above with respect to FIGS. 3-7. In the illustrated example, the parent user interface 800 provides a broadcast message button 802 to enable registered users associated with the parent user category to receive and view broadcast messages, similar to the broadcast message capability discussed above with respect to the student user interface 300 and teacher user interface 600.

In some embodiments, the parent user interface 800 may also include an ongoing alerts button 804, which displays information related to alerts that have been generated but have yet to be resolved. The ongoing alerts button 804 may provide an interface showing any ongoing alerts triggered by a student associated with the parent in some embodiments. Alerts triggered by teachers for students associated with the parent may also be visible by pressing the ongoing alerts button 804 in various embodiments. In this way, parents can stay informed about alerts generated by those school employees, namely teachers, whom are in contact with the parent's child.

Various embodiments of the parent user interface 800 may include a resolved alerts button 806, which provides a listing of alerts that have been resolved, meaning the emergency has been addressed and is no longer ongoing. Users associated with the parent user category may view all resolved alerts that have been triggered within the CSS by pressing the resolved alerts button 806. By providing a listing of all resolved alerts, parents may keep abreast of the goings on at the school, to provide an idea of the level of safety provided by the institution. In other embodiments, the resolved alerts button 806 may provide an interface displaying only those resolved alerts which the student or students associated with the parent initiated.

Although the parent user category has been shown to have only passive, monitoring capabilities in the example parent user interface of FIG. 8, other embodiments and implementations of the present disclosure may provide active capabilities for the parent user category. For example, some embodiments may enable the parent user category to initiate an alert. The extent of the capabilities provided to the parent user category depends on the particular implementation and the intentions of the implementing institution.

In addition to enabling parents to be kept abreast of emergencies affecting an associated student, the CSS 200 may allow for each parent-student grouping to identify multiple security zones of interest in various embodiments. For example, in addition to the security zone associated with the school, the student may also be associated with a second security zone—or home zone—encompassing the student's home. The CSS 200 may be configured to alert the associated parent when the student leaves or enters either the main security zone or the home zone. In this way, the associated parent would be capable of determining whether something has gone on between the student leaving school for the day and coming home, or vice versa. The CSS 200 may be configured to identify when a student user as entered or left a zone, and generate a notification that is sent to the associated parent user.

Another user category of the example school implementation is the administrator user category. As discussed above with respect to FIG. 2, an administrator device 208 is a device where the register user logged into the CSS application operating on the device is associated with the administrator user category. In the example school implementation, an administrator may be the school principal, vice principal, administrative staff, campus security, or other school officials granted the responsibility of addressing emergencies that arise on campus. In some cases, all teachers may also be associated with the administrator user category, and no separate teacher user category need be utilized.

Figure 9:
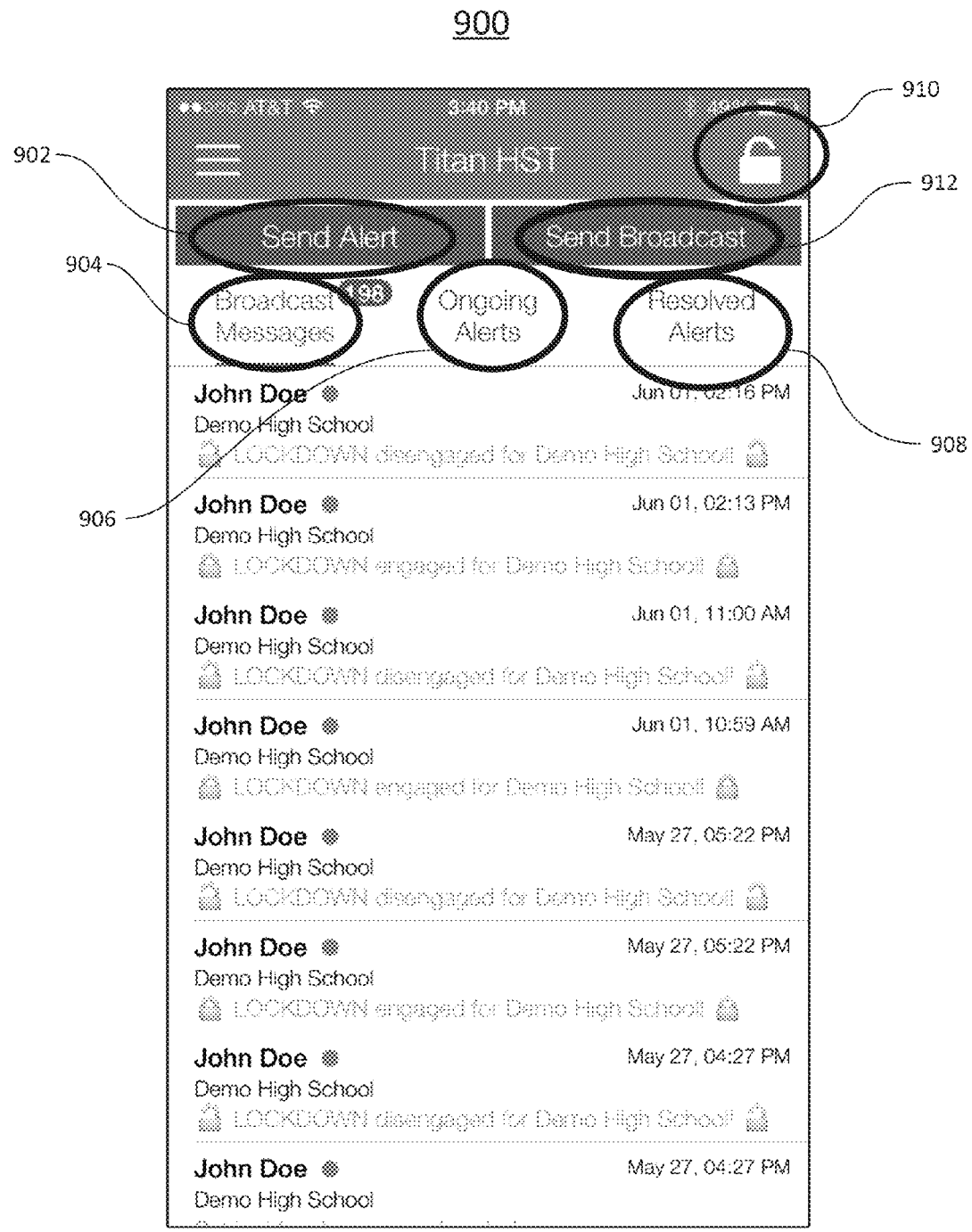
FIG. 9 is an example administrator/police interface of an example community safety system interface operating on a user device accordance with embodiments of the technology of the present disclosure, implemented in an example school environment.

FIG. 9 is an example administrator user interface 900 in accordance with the technology of the present disclosure. As illustrated in FIG. 9, the administrator user interface 900 provides the greatest amount of capabilities compared with the student user interface 300, teacher user interface 600, or parent user interface 800.

The example administrator user interface 900 provides many of the same capabilities that have been described above. Various embodiments provide administrators with the ability to initiate alerts by pressing a Send Alert button 902, which brings up an alert type area and interface similar to the student user interface 300 and the teacher user interface 600. A broadcast messages button 904, ongoing alerts button 906, and resolved alerts button 908 may be provided in various embodiments. These buttons may function in a similar way as those described above with respect to the parent user interface 800, without the restrictions based on association with a student or other user category. As an administrator, it would be important to allow the administrator to view all alerts and broadcasts initiated within the CSS in order to stay abreast of all occurrences on campus. The administrator user interface 900 may also include a lockdown initiator 910, similar to the one described above with respect to the teacher user interface 600.

In addition to similar functionality shared with one or more of the student, teacher, and parent user categories, the administrator user interface 900 may also include the capability to generate and send out broadcast messages to some or all of the registered users of the CSS. By pressing the Send Broadcast button 912, an administrator may create a broadcast message, similar to the example broadcast message 504 described above with respect to FIG. 5.

Figure 10B:
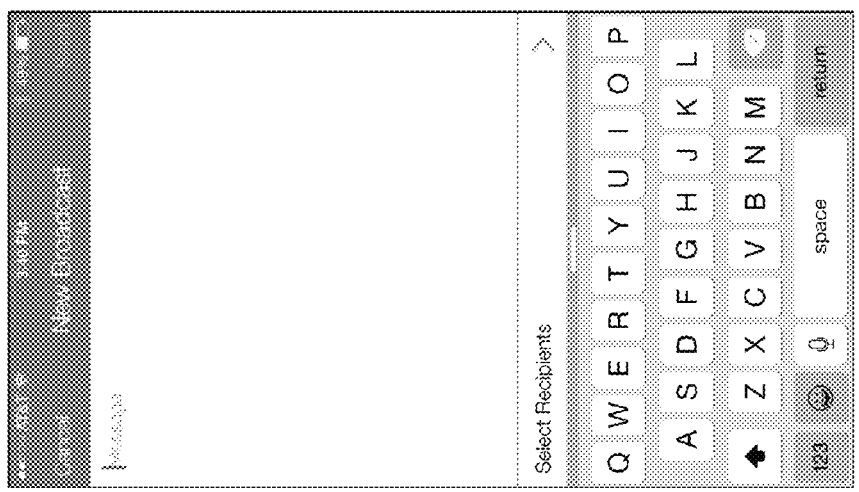
FIGS. 10A & 10B are example broadcast generation interfaces interface of an example community safety system interface operating on an administrator device accordance with embodiments of the technology of the present disclosure, implemented in an example school environment.
Figure 10A:
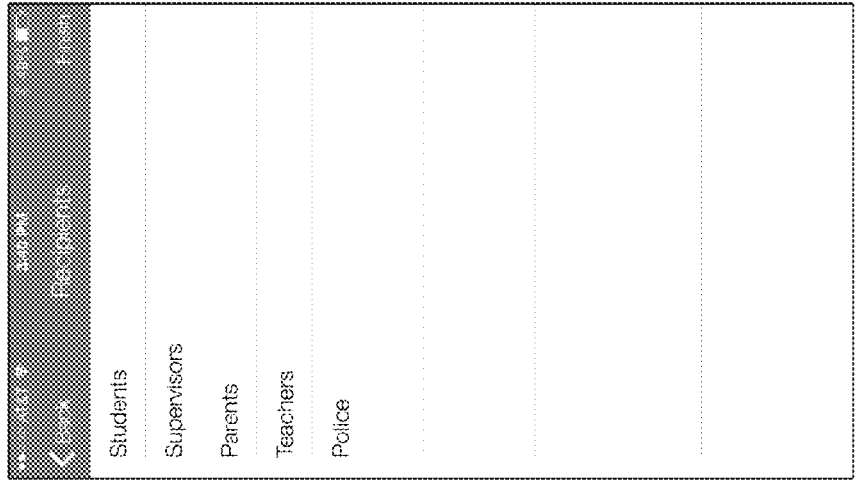

FIG. 10A illustrates an example broadcast generation interface 1000 in accordance with the technology of the present disclosure. The broadcast generation interface 1000 is displayed on the administrator device when the Send Broadcast button 912 is pressed. An administrator may create a broadcast message, providing information relevant to the registered users of the CSS. As illustrated in FIG. 10B, the administrator may select one or more of the user categories as recipients of the broadcast message generated through the broadcast generation interface 1000. For example, using the user category list 1005, the administrator may choose to send a broadcast message only to the teacher user category.

To ensure that broadcast messages or multiple alert notifications are sent and received in a timely manner, the NME 202 may be configured to handle 100% load at a given time. For example, in some embodiments the NME 202 may include additional servers and/or load capacity than is required during quiet periods. When a large transmittal of information is required, such as if a large emergency occurs and a broadcast message need be sent to all registered users, the NME 202 may identify the need for additional capacity and utilize its entire capacity. This dedication of resources ensures that all messages are timely sent and received, thus avoiding the delays that have occurred with current systems. Various embodiments may have one or more servers or areas of capacity within the NME 202 dedicated to servicing only broadcast messages, thereby ensuring sufficient capacity for such situations.

As discussed above with respect to FIG. 2, the police 214 may also be one of the user categories for the CSS 200. By including the police 214 within the CSS 200, the police 214 are capable of staying abreast of emergencies occurring within the security zone 210 of the CSS 200. In some embodiments, the police 214 may have similar capabilities as those of the administrator user category described above with respect to FIG. 9. The police 214 may have the ability to generate broadcast messages, like the administrator user category. By including the police 214 within the CSS 200 and providing the ability to generate broadcast messages like administrators, embodiments of the technology disclosed herein provide an informational advantage to registered users of the CSS 200 over other emergency notification systems.

Under current systems, the police are capable, at the most, of receiving information about an emergency from those at the scene, generally only after arriving at the scene themselves. The two-way communication capable with embodiments of the present disclosure enable the police to receive timely information from those at the scene in a timely manner, and also to present relevant information to the community at large in an effective manner. This leads to a more robust response and a better informed community. In addition, the police may also utilize a system in accordance with embodiments of the technology of the present disclosure to provide information to the registered users of other emergencies or situations that may not be directly related to the campus, but which the police believe the registered users should be aware or could help resolve.

Although the example school implementation discusses including the police 214 within the CSS 200, other public authorities may also be registered with the CSS 200. For example, the fire department may be registered with the CSS 200. In some embodiments, the police department and the fire department may be separated into distinct user categories, or the departments could be lumped into a civil service user category. As another example, the local hospital may be registered with the CSS 200, to enable faster dispatch of ambulances to the school or other institution.

Having just described the basic capabilities of each of the different example user categories, the interactions between the different components of the system for different notification events will now be described in detail.

Figure 11:
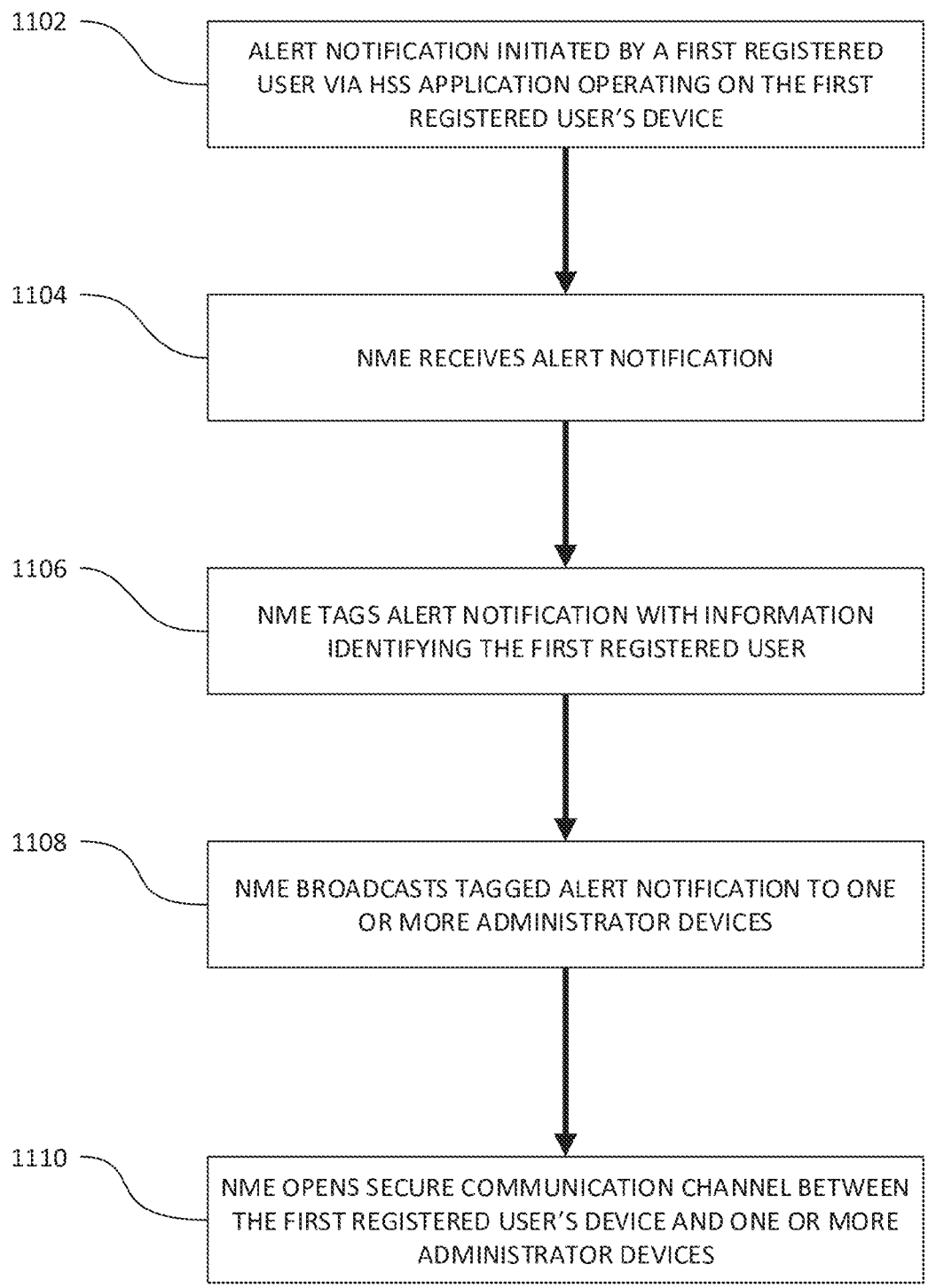
FIG. 11 is a flow diagram of an example alert notification process in accordance with embodiments of the technology of the present disclosure.

As discussed above, many of the user categories are capable of initiating alerts, whereby one or more administrators are notified of an emergency within the security zone of the CSS. FIG. 11 is an example process flow of the alert notification process in accordance with the technology of the present disclosure. At 1102, an alert notification is initiated by a first registered user via an CSS application operating on the first registered user's device. In the example school implementation, the first registered user may be a student, teacher, administrator, or the police. In other embodiments, the user categories may differ.

At 1104, the NME receives the alert notification initiated by the first registered user. The NME is communicatively coupled to the CSS application of the first user's device via a network. The network may be one of: cellular telecommunications protocols, such as GSM, UMTS, CDMA2000, LTE, or WiMAX; wired communication methods, such as cable, DSL, dial-up, or fiber-optic; or wireless communication methods, such as satellite communications or Wi-Fi.

At 1106, upon receiving the alert notification, the NME tags the alert notification with information identifying the first registered user. By tagging the alert notification with information identifying the user who initiated the alert, the system injects accountability into the process to curtail prank alerts from being set off. In some embodiments, the NME may tag the alert notification with information identifying the location of the first registered user. The location data may come from a GPS module operating within the first registered user's device. Various embodiments may include the location data with the alert notification. In other embodiments, the NME may pull the information from the first registered user's device once the NME receives the alert notification.

Although location information may be included, privacy concerns may encourage that the NME does not constantly monitor any registered user's location while connected to the CSS. For example, the NME may not retrieve location data until an alert is received. In other embodiments, the NME may obtain the location data once the CSS application is activated on the user's device, such as opening the application. In such embodiments, the idea is that a registered user may be seeking to generate an alert notification. In some embodiments, the location data may be retrieved from the first registered user's device only if requested by one or more of the administrator devices.

At 1108, the NME broadcasts the tagged alert notification to one or more administrator devices. By broadcasting the message to a plurality of administrators, the NME ensures that at least one administrator will notice the alert and address the situation. In various embodiments, more than one administrator may acknowledge the alert via an CSS application operating on the administrator device. In such cases, a group message is created.

Figure 12:
FIG. 12 is an example communication channel interface of an example community safety system application operating on an administrator device in accordance with embodiments of the technology of the present disclosure.

At 1110, for each administrator that acknowledges the alert, the NME opens a secure communication channel between the first registered user's device and one or more administrator devices. The communication channel interface 400 of FIG. 4 was discussed earlier with respect to the student user interface 300 of FIG. 2. FIG. 12 illustrates an example communication channel interface 1200 from the perspective of an administrator in accordance with the technology of the present disclosure. As seen in FIG. 12, the communication channel interface 1200 is not much different from the student's communication channel interface 400 described above.

As illustrated in FIG. 12, the communication channel interface 1200 of the administrators and/or police includes an identification area 1202, containing information identifying the first registered user and the alert type selected for initiation. In some embodiments, greater or lesser detail may be included within the identification area 1202, or available through an information button 1204.

Figure 13:
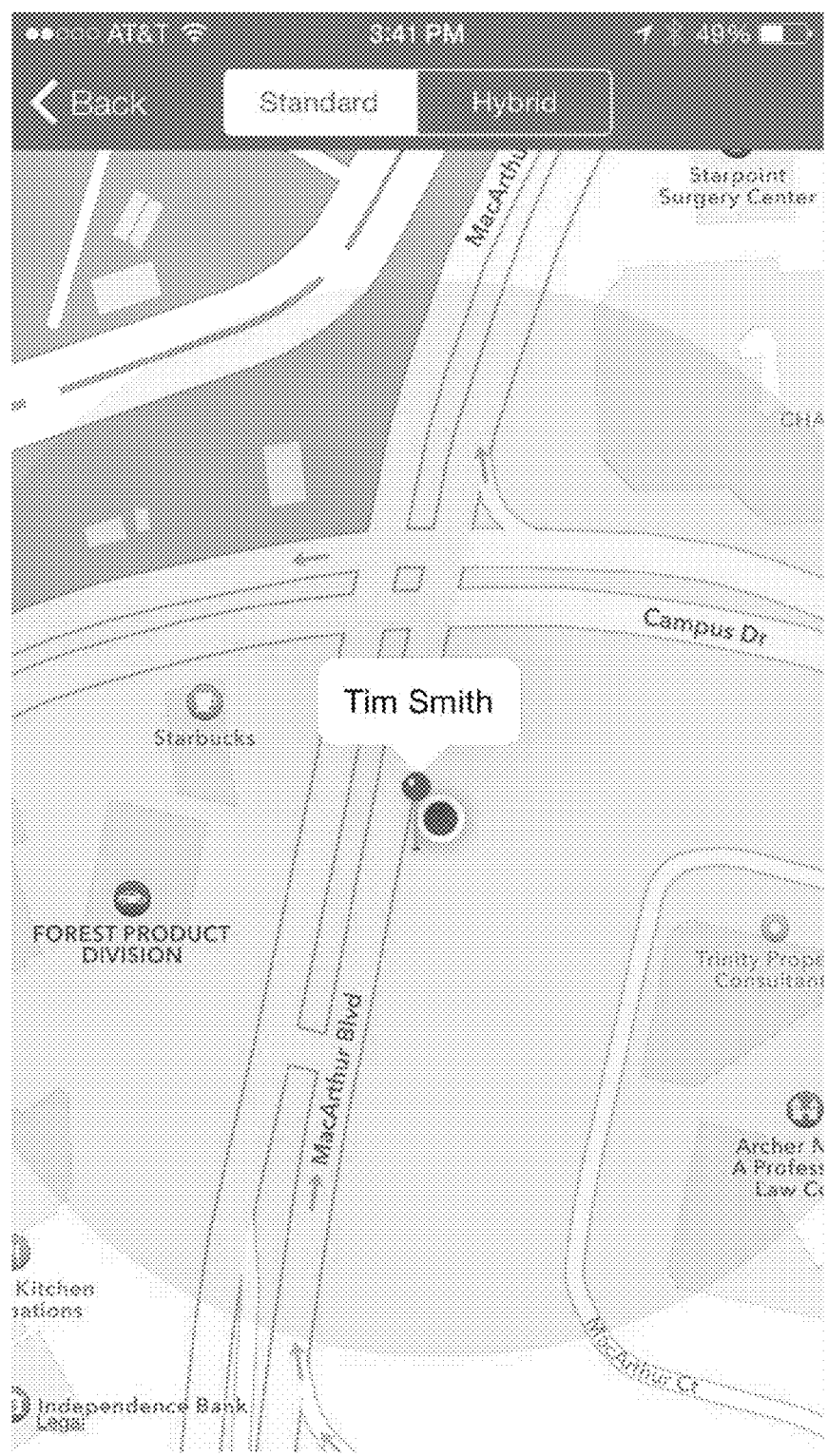
FIG. 13 is an example location visualization interface of an example community safety system application operating on an administrator device in accordance with embodiments of the technology of the present disclosure.

As discussed above, location information may be included with the alert notification. In some embodiments, the communication channel interface 1200 may include a map button 1206. By pressing the map button 1206, an administrator or the police may view where the first registered user is located within the security zone. The map button 1206 may textually display the first registered user's location, such as an insert displaying an address, building name, or other location identification. A visual representation of the first registered user's location may be displayed in various embodiments. FIG. 13 is an illustration of a location visualization interface 1300 in accordance with such embodiments of the present disclosure.

In addition to utilizing location information to provide more context to an emergency, the NME 202 may utilize location information to determine whether a user should be permitted to initiate an alert. In some implementations, it may be beneficial to limit the ability of registered users, such as students, to generate an emergency alert while not physically located on campus. In addition to tagging emergency alerts with identifying information, limiting the ability to send alerts from outside the security zone helps curtail potential abuse of the two-way communication to generate false emergency alerts for purposes of pranks. To combat this, the NME 202 includes a "geo-fence" capability, used to determine whether an emergency alert should be permitted to be sent to administrative users.

Figure 14:
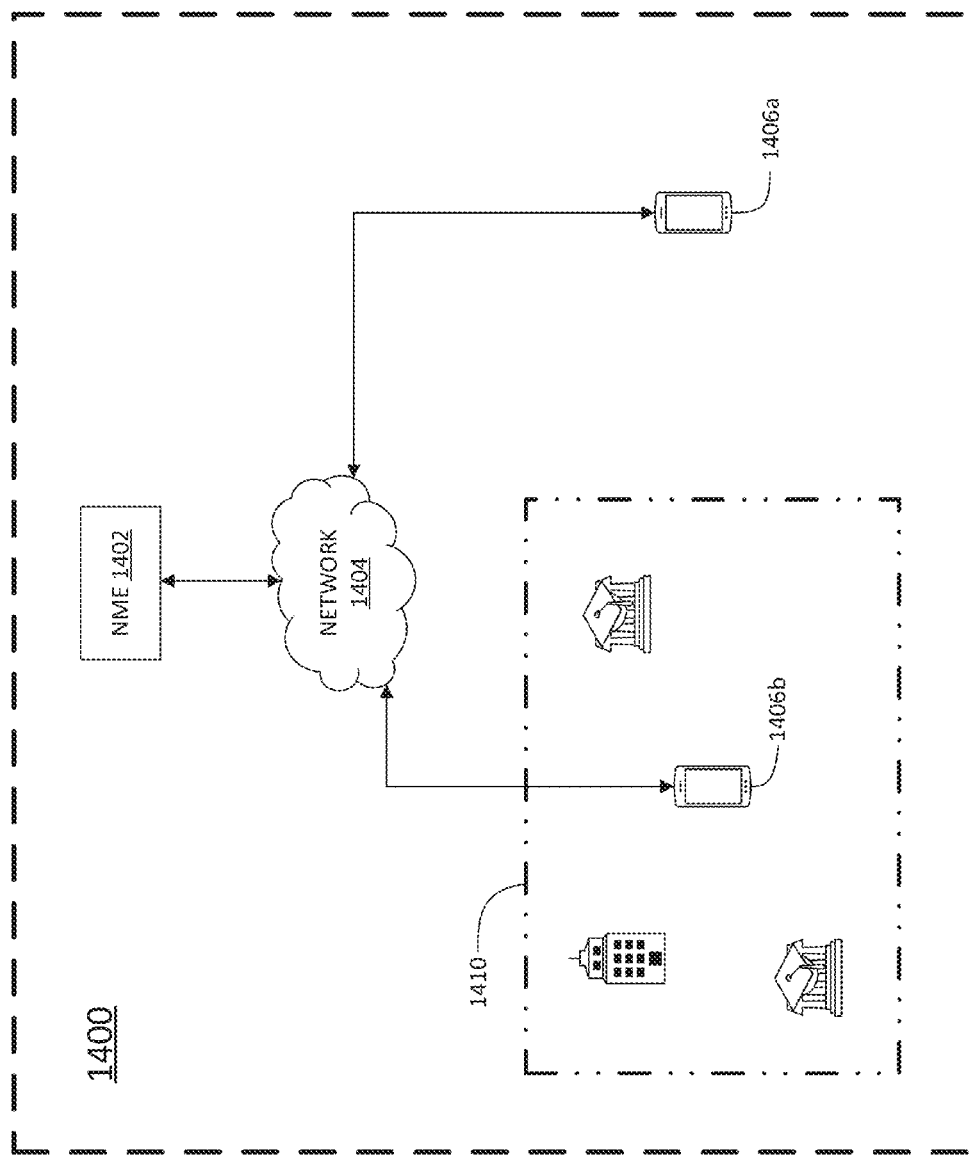
FIG. 14 is an example environment where a student attempts to generate an alert notification while outside an example security zone, in accordance with embodiments of the technology of the present disclosure.

FIG. 14 illustrates an example CSS 1400 with which a "geo-fence" capability of the NME 1402 in accordance with the technology of the present disclosure is described. In addition to utilizing location information to provide more context to an emergency, the NME 202 may utilize location information to determine whether a user should be permitted to initiate an alert. In some implementations, it may be beneficial to limit the ability of registered users, such as students, to generate an emergency alert while not physically located on campus. In addition to tagging emergency alerts with identifying information, limiting the ability to send alerts from outside the security zone helps curtail potential abuse of the two-way communication to generate false emergency alerts for purposes of pranks. To combat this, the NME 202 includes a "geo-fence" capability, used to determine whether an emergency alert should be permitted to be sent to administrative users.

As illustrated in FIG. 14, the CSS 1400 is similar to the CSS 200 described with respect to FIG. 2. Unlike FIG. 2, however, the CSS 1400 shows user device 1406a, which is outside the security zone 1410, and user device 1406b, which is inside the security zone. When an NME 1402 receives an emergency alert from 1406a and 1406b, the NME 1402 can utilize location data from the user device of the registered users to determine whether the user is within the security zone and, accordingly, should be permitted to notify one or more administrators of a potential emergency.

Figure 15:
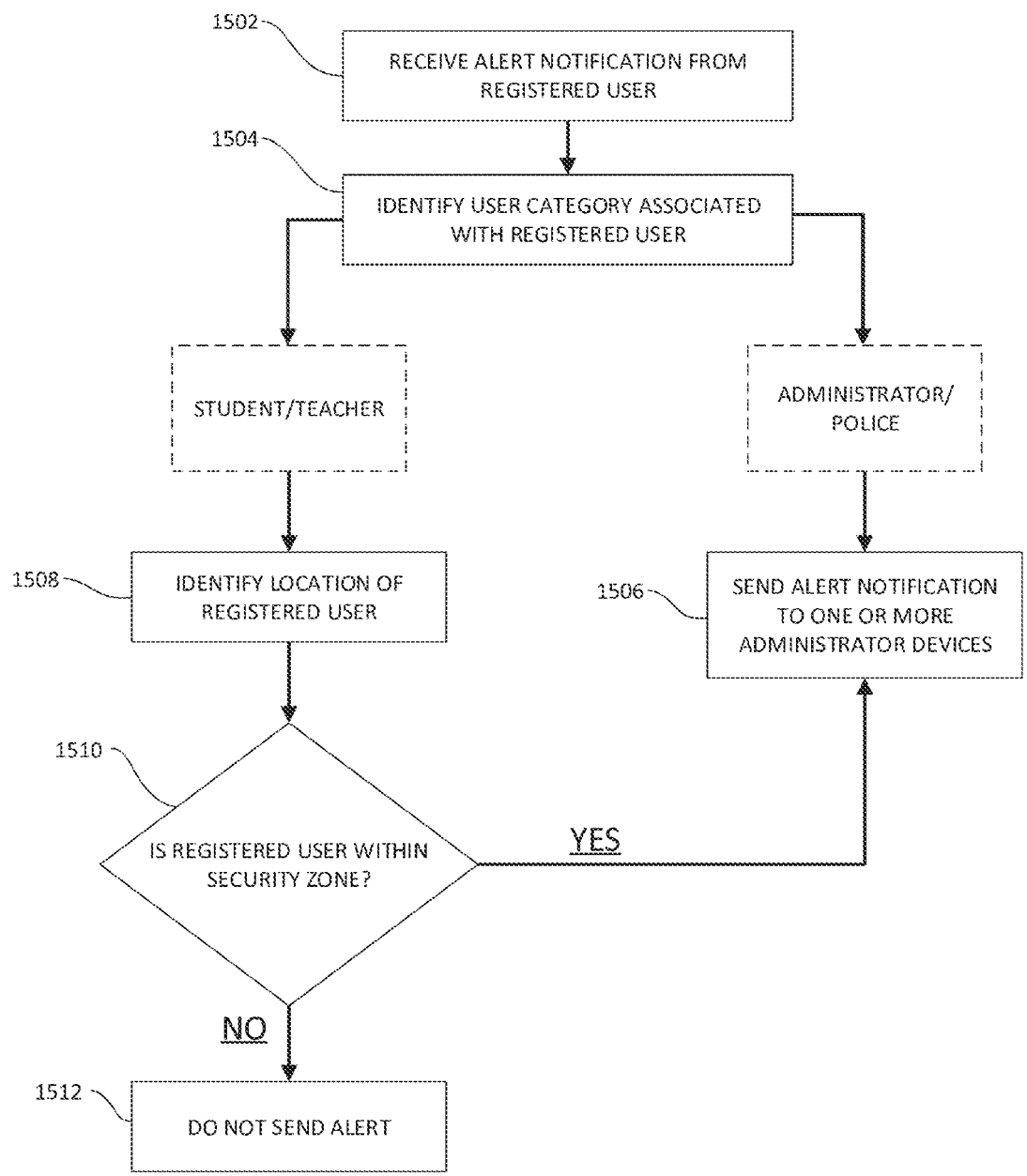
FIG. 15 is a flow diagram of an example location-based capability determination method in accordance with embodiments of the technology of the present disclosure.

FIG. 15 is a flow diagram of an example location-based capability determination method of the NME 1402 in accordance with embodiments of the technology herein disclosed. At 1502, the NME 1402 receives an alert notification from a registered user. At 1504, the NME 1402 identifies the user category associated with the registered user who sent the alert notification. As discussed above, the registered user may have been a student, teacher, administrator, or police in various embodiments. The NME 1402 determines which user category applies to the registered user who sent the alert notification. In the example school implementation, only registered users associated with the administrator user category of the police user category are allowed to initiate an alert notification from outside the security zone, while students and teachers are only capable of generating an emergency alert while within the security zone. Not only does this help curtail pranks and make it easier to maintain accountability, such limitation helps to ensure that the students and teachers' privacies are protected.

If the NME 1402 identifies the registered user as being associated with the administrator user category or the police user category, the NME 1402 proceeds normally, broadcasting the alert notification to one or more administrator devices at 1506.

If the NME 1402 identified the registered user as being associated with the student user category of the teacher user category, the NME 1402 identifies the location of the registered user. In many embodiments, identifying the location of the registered user may involve retrieving location data from the user device of the registered user. Such information may be obtained by the NME 1402 by retrieving the information from a GPS receiver of the user device, in some embodiments. In other embodiments, the location information may be included in the original alert notification.

Once the NME 1402 identifies the registered user's location, the NME 1402 determines whether the registered user's location is within the security zone at 1510. As stated above, in some embodiments the student user category and teacher user category are limited to only sending alert notifications to one or more administrators when on campus (i.e., within the security zone). If the NME 1402 determines that the student or teacher is within the security zone, the NME 1402 at 1506 proceeds normally. If the NME 1402 determines that the student or teacher is outside of the security zone, the NME 1402 at 1512 does not send the alert notification to one or more administrator devices. In some embodiments, the NME 1402 may display an error message to the student or teacher via the user interface of the CSS application operating on the user device.

Figure 18:
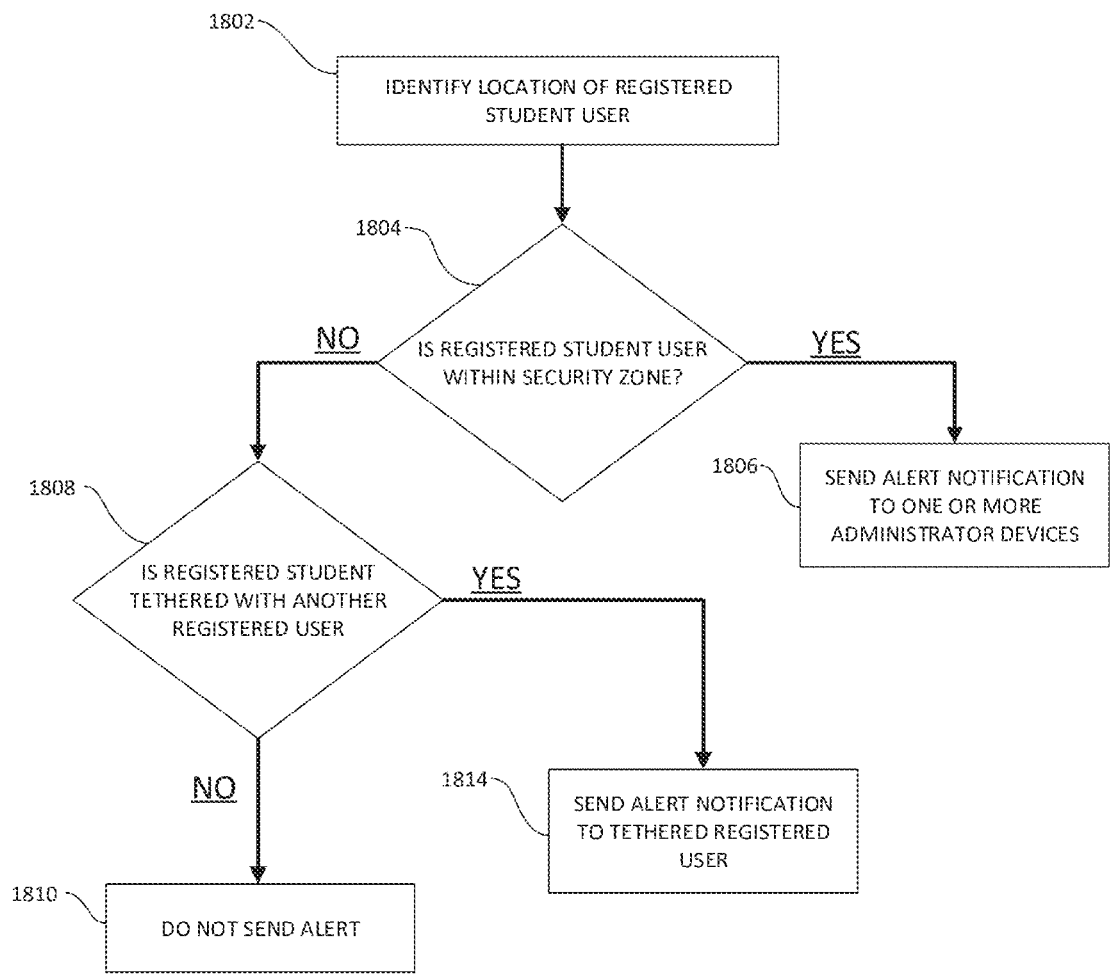
FIG. 18 is a flow diagram of an example location-based capability determination method including a student-parent association in accordance with embodiments of the technology of the present disclosure.

As discussed above with respect to FIG. 8, a student user category may be associated with, or tethered to, a parent user category. With reference to FIG. 14, the CSS 1400 may enable a student user to send an alert from outside the security zone 1410 to the tethered parent in some embodiments. FIG. 18 is a flow diagram illustrating another example location-based capability determination method involving tethered user categories in accordance with embodiments of the technology disclosed herein.

At 1802, the NME 1402 identifies the location of the registered student user. Although not shown, the identification of the registered student user's location is determined after the NME 1402 identifies a received alert as coming from a student user, similar to 1502 and 1504 described with respect to FIG. 15. In many embodiments, identifying the location of the registered user may involve retrieving location data from the user device of the registered user. Such information may be obtained by the NME 1402 by retrieving the information from a GPS receiver of the user device, in some embodiments. In other embodiments, the location information may be included in the original alert notification.

The NME 1402 then determines whether the registered student user is within the security zone at 1804. If the NME 1402 determines that the student is within the security zone, the NME 1402 at 1806 proceeds normally and transmits the alert to one or more administrator devices.

If the NME 1402 determines that the student is outside of the security zone, the NME 1402 at 1808 determines whether the registered student user is tethered with another registered user. If the NME 1402 determines that the student is not tethered with any other registered users, no alert is sent at 1810. If the NME does determine that the student is tethered with another registered user, the NME 1402 at 1814 sends the alert to the tethered registered user.

Although discussed in view of an example implementation by a school, the technology of the present disclosure is not limited only to the school environment. The technology may be implemented in many different types of institutions, such as hospitals, shopping malls, fairs and carnivals, conferences centers and convention halls, theme parks, sports venues, and other institutions where many people congregate. The technology may also be implemented by less publically accessible institutions, such as factories or office buildings. After reading the description herein, it will become apparent to one of ordinary skill in the art that the disclosed technology can be implemented on any number of different campuses and by any number of different institutions. Nothing in this disclosure should be interpreted as limiting the scope of the technology disclosed herein to the discussed embodiments.

Figure 17:
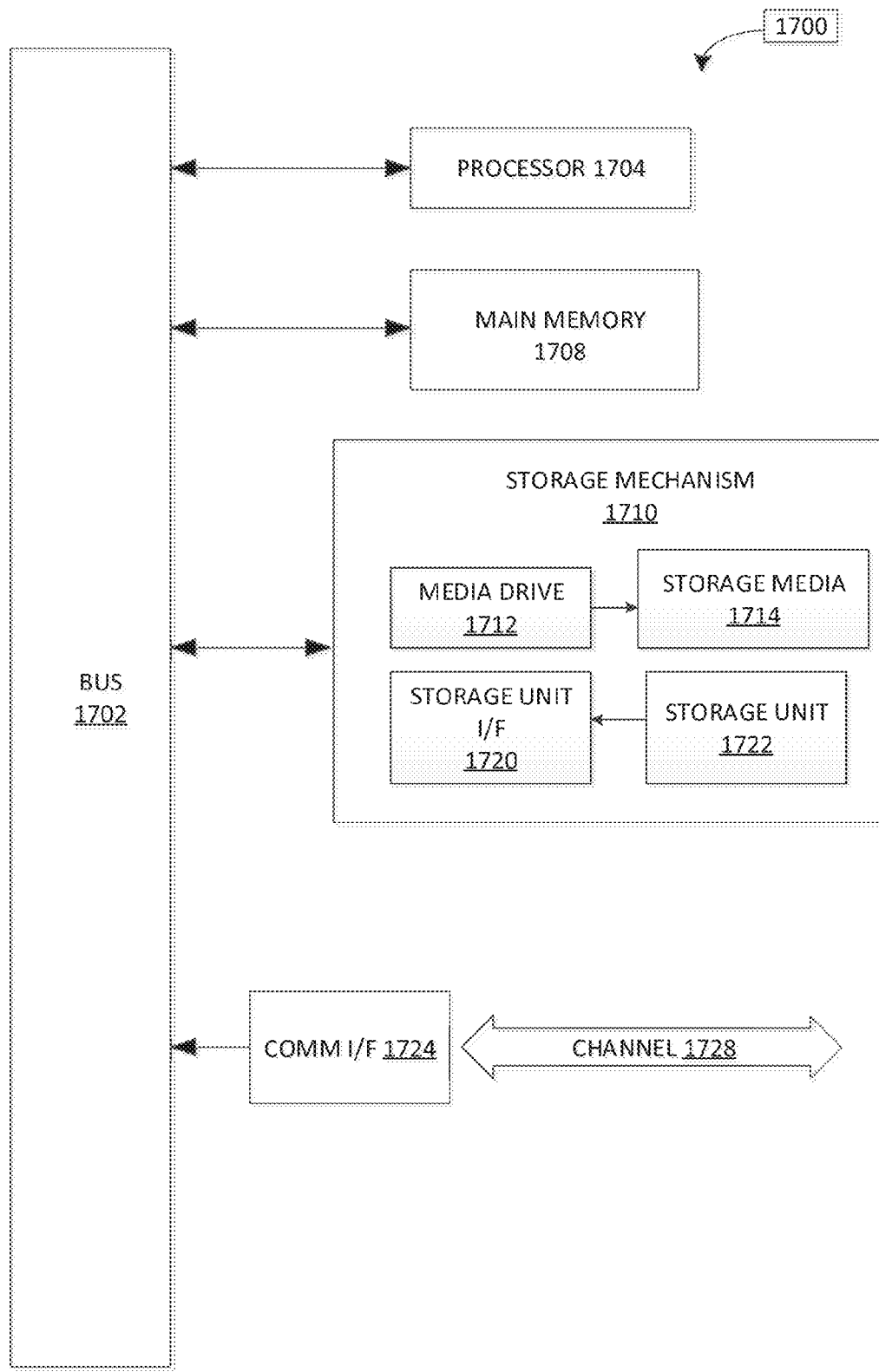
FIG. 17 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 17. Various embodiments are described in terms of this example-computing module 1700. After reading this description, it will become apparent to a person skilled in the relevant art how to implement the technology using other computing modules or architectures.

Referring now to FIG. 17, computing module 1700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1700 might include, for example, one or more processors, controllers, control modules, or other processing devices, such as a processor 1704. Processor 1704 might be implemented using a general-purpose or special-purpose processing engine such as, for example, a microprocessor, controller, or other control logic. In the illustrated example, processor 1704 is connected to a bus 1702, although any communication medium can be used to facilitate interaction with other components of computing module 1700 or to communicate externally.

Computing module 1700 might also include one or more memory modules, simply referred to herein as main memory 1708. For example, preferably random access memory (RAM) or other dynamic memory, might be used for storing information and instructions to be executed by processor 1704. Main memory 1708 might also be used for storing temporary variables or other intermediate information during execution of instructions to be executed by processor 1704. Computing module 1700 might likewise include a read only memory ("ROM") or other static storage device coupled to bus 1702 for storing static information and instructions for processor 1704.

The computing module 1700 might also include one or more various forms of information storage mechanism 1710, which might include, for example, a media drive 1712 and a storage unit interface 1720. The media drive 1712 might include a drive or other mechanism to support fixed or removable storage media 1714. For example, a hard disk drive, a floppy disk drive, a magnetic tape drive, an optical disk drive, a CD or DVD drive (R or RW), or other removable or fixed media drive might be provided. Accordingly, storage media 1714 might include, for example, a hard disk, a floppy disk, magnetic tape, cartridge, optical disk, a CD or DVD, or other fixed or removable medium that is read by, written to or accessed by media drive 1712. As these examples illustrate, the storage media 1714 can include a computer usable storage medium having stored therein computer software or data.

In alternative embodiments, information storage mechanism 1710 might include other similar instrumentalities for allowing computer programs or other instructions or data to be loaded into computing module 1700. Such instrumentalities might include, for example, a fixed or removable storage unit 1722 and an interface 1720. Examples of such storage units 1722 and interfaces 1720 can include a program cartridge and cartridge interface, a removable memory (for example, a flash memory or other removable memory module) and memory slot, a PCMCIA slot and card, and other fixed or removable storage units 1722 and interfaces 1720 that allow software and data to be transferred from the storage unit 1722 to computing module 1700.

Computing module 1700 might also include a communications interface 1724. Communications interface 1724 might be used to allow software and data to be transferred between computing module 1700 and external devices. Examples of communications interface 1724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1724 might typically be carried on signals, which can be electronic, electromagnetic (which includes optical) or other signals capable of being exchanged by a given communications interface 1724. These signals might be provided to communications interface 1724 via a channel 1728. This channel 1728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1708, storage unit 1720, media 1714, and channel 1728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A community safety system, comprising:
a notification management entity comprising one or more servers, the notification management entity is communicatively coupled to one or more user devices and one or more administrator devices;
a plurality of registered users, wherein each registered user of the plurality of registered users is associated with a user category of a set of user categories;
the notification management entity maintaining a list of the plurality of registered users and each registered user's associated user category and a list of security zones associated with the plurality of registered users; and
a community safety system application operating on each of the one or more user devices and the one or more administrator devices;
wherein at least one of the one or more administrator devices is associated with a police department;
wherein the notification management entity, upon receiving an emergency alert from a registered user via a user device, opens a dedicated and secure communication channel between the user device of the registered user and one or more administrator devices, and wherein data transmitted between the one or more user devices, one or more administrator devices, and the notification management entity are encrypted;
wherein at least one user category is restricted from utilizing one or more features when the user is not physically located within a security zone, the security zone comprising a continuous geographic area, one or more buildings or other structures, one or more non-continuous geographic areas, or a combination thereof;
wherein the notification management entity is the only device within the community safety system that has access to a plurality of personal information associated with each registered user.

2. The community safety system of claim 1, wherein the one or more administrator devices comprises the at least one administrator device associated with a police department.

3. The community safety system of claim 1, wherein voice, video, text, or photographs may be transmitted over the communication channel between the user device of the registered user and the one or more administrator devices.

4. The community safety system of claim 1, the notification management entity further providing information of a registered user to one or more user devices or one or more administrator devices while an emergency alert initiated by the registered user is ongoing.

5. The community safety system of claim 4, wherein information of a registered user includes at least one of: name of the registered user; email address of the registered user; location data of the registered user, wherein location data is obtained by the notification management entity only when the emergency alert is initiated; or phone number of the registered user.

6. The community safety system of claim 1, the notification management entity providing a set of capabilities to a registered user via a user interface of the community safety system application operating on a user device or an administrator device associated with the registered user.

7. The community safety system of claim 6, the set of capabilities being the set of capabilities associated with the associated user category of the registered user logged into the community safety system application operating on the user device or the administrator device.

8. The community safety system of claim 1, the notification management entity configured to obtain location data of a registered user from one or more location systems of a user device.

9. The community safety system of claim 8, wherein the location systems of the user device comprises a GPS receiver.

10. The community safety system of claim 1, the network comprising one or more of a wireless network, a cellular network, a wired network.

11. The community safety system of claim 1, wherein the one or more user devices comprise one or more of: mobile phones; laptops; desktops; tablets; wearable communication devices, such as smartwatches; or PDAs.

12. The community safety system of claim 1, wherein the one or more administrator devices comprise one or more of: mobile phones; laptops; desktops; tablets; wearable communication devices, such as smartwatches; or PDAs.

13. The community safety system of claim 1, wherein the community safety system application comprises a program downloaded to a user device or an administrator device.

14. The community safety system of claim 1, wherein the community safety system application comprises an application running within a web browser software operating on a user device or an administrator device.

15. The community safety system of claim 1, wherein the notification management entity provides a lockdown initiator to a set of registered users of the plurality of registered users.

16. The community safety system of claim 15, wherein the notification management entity maintains a lockdown broadcast message, the notification management entity transmitting the lockdown broadcast message to the plurality of registered users when the lockdown initiator is activated.

17. The community safety system of claim 1, wherein the community safety system is implemented by a school, and the set of user categories comprises one or more of: a student user category; an administrator user category; a teacher user category; or a police user category.

18. The community safety system of claim 17, wherein a broadcast message may be initiated by a registered user associated with the administrator user category or the police user category.

19. The community safety system of claim 17, the security zone comprising one or more school buildings and grounds defining a school campus, and wherein the notification management entity prohibits a registered user associated with the student user category to initiate an emergency alert when the registered user is not within a security zone.

20. The community safety system of claim 19, the security zone further comprising a buffer zone extending beyond the school campus.

21. The community safety system of claim 17, the set of user categories further comprising a parent user category, and wherein a registered user associated with the parent user category can be tethered to a registered user associated with the student user category and the notification management entity sends an emergency alert generated by the registered user associated with the student user category to the tethered registered user associated with the parent user category.

22. The community safety system of claim 1, wherein a first registered user associated with a user category may be tethered to a second registered user associated with a second user category.

23. The community safety system of claim 22, wherein the notification management entity sends an emergency alert generated by the first registered user to the second registered user when the first registered user is outside the security zone.

24. The community safety system of claim 22, wherein the second registered user may create a home zone associated with the first registered user, and the notification management entity is configured to send an alert to the second registered user whenever the first registered user enters or leaves the security zone, the home zone, or a combination of both.

25. The community safety system of claim 1, wherein the notification management entity, upon receipt of a request for an escort, transmits location data associated with a requesting registered user to one or more of the plurality of registered users.

* * * * *

UNITED STATES PATENT AND TRADEMARK OFFICE
CERTIFICATE OF CORRECTION

Page 1 of 1

PATENT NO. : 9,699,310 B2
APPLICATION NO. : 14/789876
DATED : July 4, 2017
INVENTOR(S) : Merjanian et al.

It is certified that error appears in the above-identified patent and that said Letters Patent is hereby corrected as shown below:

On the Title Page

Item (72) Inventor is corrected to read:
-- Vic Merjanian, Newport Beach (CA);
Paul Samra, Newport Beach (CA);
Ryan Khalili, Newport Beach (CA) --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*